United States Patent
Bhan

(10) Patent No.: US 7,918,992 B2
(45) Date of Patent: *Apr. 5, 2011

(54) SYSTEMS, METHODS, AND CATALYSTS FOR PRODUCING A CRUDE PRODUCT

(75) Inventor: Opinder Kishan Bhan, Katy, TX (US)

(73) Assignee: Shell Oil Company, Houston, TX (US)

( * ) Notice: Subject to any disclaimer, the term of this patent is extended or adjusted under 35 U.S.C. 154(b) by 306 days.

This patent is subject to a terminal disclaimer.

(21) Appl. No.: 11/400,542

(22) Filed: Apr. 7, 2006

(65) Prior Publication Data

US 2006/0231465 A1 Oct. 19, 2006

Related U.S. Application Data

(60) Provisional application No. 60/670,137, filed on Apr. 11, 2005.

(51) Int. Cl.
C10G 45/00 (2006.01)
C10G 29/04 (2006.01)

(52) U.S. Cl. .. 208/253; 208/89; 208/111.3; 208/111.35; 208/143; 208/209; 208/210; 208/216 PP; 208/216 R; 208/217; 208/251 H; 208/254 H; 502/152; 502/161; 502/170; 502/238

(58) Field of Classification Search ............ 208/89, 208/206, 216 PP, 253, 111.3, 111.35, 143, 208/209, 210, 216 R, 217, 251 H, 254 H; 502/152, 161, 170, 238
See application file for complete search history.

(56) References Cited

U.S. PATENT DOCUMENTS

| | | | |
|---|---|---|---|
| 1,111,580 A | 9/1914 | Herber | |
| 2,850,435 A | 9/1958 | Fierce et al. | 196/41 |
| 2,902,429 A | 9/1959 | Scott | 208/89 |
| 2,921,023 A | 1/1960 | Holm | 208/263 |
| 3,025,231 A | 3/1962 | Friedman et al. | 208/213 |
| 3,051,645 A | 8/1962 | Wilson et al. | |
| 3,080,435 A | 3/1963 | Nager | |
| 3,081,256 A | 3/1963 | Hendal et al. | |
| 3,136,714 A | 6/1964 | Gibson et al. | |
| 3,547,585 A | 12/1970 | Urban | 23/224 |

(Continued)

FOREIGN PATENT DOCUMENTS

CA 1121293 4/1982

(Continued)

OTHER PUBLICATIONS

Hannan, M.A. et al, "Determination of Oxygen, Nitrogen, and Silicon in Nigerian Fossil Fuels by 14 MeV Neutron Activation Analysis", J. of Radioanalytical and Nuclear Chemistry, vol. 256, No. 1 (2003); pp. 61-65.

(Continued)

*Primary Examiner* — Prem C Singh
(74) *Attorney, Agent, or Firm* — Richard B. Taylor

(57) ABSTRACT

Methods and systems for contacting of a crude feed with one or more catalysts to produce a total product that includes a crude product are described. The crude product is a liquid mixture at 25° C. and 0.101 MPa. The crude product has an MCR content of at most 90% of the MCR content of the crude feed. One or more other properties of the crude product may be changed by at least 10% relative to the respective properties of the crude feed.

11 Claims, 3 Drawing Sheets

U.S. PATENT DOCUMENTS

| | | | |
|---|---|---|---|
| 3,553,279 A | 1/1971 | Bawa | |
| 3,558,474 A | 1/1971 | Gleim et al. | |
| 3,576,737 A | 4/1971 | Mitchell | 208/251 |
| 3,617,501 A * | 11/1971 | Eng et al. | 208/89 |
| 3,622,495 A | 11/1971 | Gatsis et al. | 208/59 |
| 3,663,431 A | 5/1972 | Wagner | 208/143 |
| 3,677,932 A | 7/1972 | Hardesty et al. | |
| 3,679,577 A | 7/1972 | Wantland et al. | |
| 3,684,688 A | 8/1972 | Roselius | 208/50 |
| 3,696,027 A | 10/1972 | Bridge | 208/210 |
| 3,712,861 A | 1/1973 | Rosinski et al. | 208/216 |
| 3,714,031 A | 1/1973 | van der Toom et al. | |
| 3,716,478 A | 2/1973 | Kodera et al. | |
| 3,716,479 A | 2/1973 | Weisz et al. | |
| 3,730,876 A | 5/1973 | Sequeira, Jr. | 208/59 |
| 3,745,109 A | 7/1973 | Heredy et al. | |
| 3,766,054 A | 10/1973 | Weisz et al. | |
| 3,786,138 A | 1/1974 | Shalit et al. | |
| 3,812,028 A | 5/1974 | Wennerberg et al. | |
| 3,841,981 A | 10/1974 | Layng | |
| 3,846,288 A | 11/1974 | Chun et al. | 208/263 |
| 3,847,797 A | 11/1974 | Pasternak et al. | |
| 3,849,242 A | 11/1974 | Takeya et al. | |
| 3,876,523 A | 4/1975 | Rosinski et al. | 208/89 |
| 3,876,532 A | 4/1975 | Plundo et al. | |
| 3,887,455 A | 6/1975 | Hamner et al. | |
| 3,891,541 A | 6/1975 | Oleck et al. | 208/89 |
| 3,901,792 A | 8/1975 | Wolk et al. | |
| 3,902,991 A | 9/1975 | Christensen et al. | 208/211 |
| 3,920,538 A | 11/1975 | Pronk et al. | 208/89 |
| 3,923,635 A | 12/1975 | Schulman et al. | |
| 3,928,176 A | 12/1975 | Hamner et al. | |
| 3,931,052 A | 1/1976 | Oleck et al. | 252/465 |
| 3,948,759 A | 4/1976 | King et al. | |
| 3,957,620 A | 5/1976 | Fukui et al. | |
| 3,960,706 A | 6/1976 | McCollum et al. | |
| 3,960,708 A | 6/1976 | McCollum et al. | |
| 3,960,712 A | 6/1976 | Conway | 208/216 |
| 4,008,149 A | 2/1977 | Itoh et al. | 208/216 |
| 4,016,067 A | 4/1977 | Fischer et al. | 208/89 |
| 4,048,060 A * | 9/1977 | Riley | 208/210 |
| 4,051,015 A | 9/1977 | Bearden, Jr. et al. | |
| 4,062,757 A | 12/1977 | Beuther et al. | 208/61 |
| 4,067,799 A | 1/1978 | Bearden et al. | 208/112 |
| 4,080,313 A | 3/1978 | Whittam | 252/455 R |
| 4,115,324 A | 9/1978 | Ozaki et al. | |
| 4,119,528 A | 10/1978 | Baird, Jr. et al. | |
| 4,127,470 A | 11/1978 | Baird, Jr. et al. | |
| 4,191,635 A | 3/1980 | Quick et al. | 208/89 |
| 4,196,102 A | 4/1980 | Inooka et al. | 252/457 |
| 4,212,729 A * | 7/1980 | Hensley, Jr. et al. | 208/210 |
| 4,224,140 A | 9/1980 | Fujimori et al. | |
| 4,231,858 A | 11/1980 | Seitzer et al. | |
| 4,271,042 A | 6/1981 | Oleck et al. | |
| 4,276,153 A | 6/1981 | Yoshitake et al. | |
| 4,297,242 A | 10/1981 | Hensley, Jr. et al. | 252/439 |
| 4,306,964 A | 12/1981 | Angevine | 208/210 |
| 4,324,645 A | 4/1982 | Angevine et al. | 208/50 |
| 4,357,263 A | 11/1982 | Heck et al. | 252/439 |
| 4,358,361 A | 11/1982 | Peters | 208/89 |
| 4,367,164 A | 1/1983 | Shiroto et al. | 252/457 |
| 4,376,037 A | 3/1983 | Dahlberg et al. | |
| 4,389,301 A | 6/1983 | Dahlberg et al. | |
| 4,405,441 A | 9/1983 | Van Dongen et al. | 208/61 |
| 4,411,824 A | 10/1983 | Chen | 502/323 |
| 4,422,960 A | 12/1983 | Shiroto et al. | 502/206 |
| 4,424,142 A | 1/1984 | Asaoka et al. | 502/84 |
| 4,427,535 A | 1/1984 | Nongbri et al. | |
| 4,437,980 A | 3/1984 | Heredy et al. | |
| 4,440,631 A | 4/1984 | Togari et al. | 208/112 |
| 4,446,244 A | 5/1984 | Van Nordstrand | 502/84 |
| 4,447,314 A | 5/1984 | Banta | 208/89 |
| 4,450,068 A | 5/1984 | Kukes | 208/251 H |
| 4,456,699 A | 6/1984 | Hensley, Jr. et al. | 502/208 |
| 4,460,707 A | 7/1984 | Simpson | |
| 4,473,462 A | 9/1984 | Swanson | |
| 4,498,972 A | 2/1985 | Toulhoat et al. | 208/59 |
| 4,498,979 A | 2/1985 | Eberly, Jr. | |
| 4,499,203 A | 2/1985 | Toulhoat et al. | 502/247 |
| 4,520,128 A | 5/1985 | Morales et al. | 502/210 |
| 4,525,472 A | 6/1985 | Morales et al. | 502/323 |
| 4,530,757 A | 7/1985 | Rankel et al. | 208/251 R |
| 4,549,957 A | 10/1985 | Hensley, Jr. et al. | 208/216 PP |
| 4,560,468 A | 12/1985 | Kukes et al. | 208/110 |
| 4,564,439 A | 1/1986 | Kuehler et al. | |
| 4,572,778 A | 2/1986 | Ward | 208/89 |
| 4,587,012 A | 5/1986 | Quann | 208/251 H |
| 4,588,709 A | 5/1986 | Morales et al. | 502/314 |
| 4,591,426 A | 5/1986 | Krasuk et al. | |
| 4,592,827 A | 6/1986 | Galiasso et al. | 208/59 |
| 4,595,667 A | 6/1986 | Takase et al. | 502/63 |
| 4,613,425 A | 9/1986 | Higashi et al. | 208/89 |
| 4,626,412 A | 12/1986 | Ebner et al. | |
| 4,659,454 A | 4/1987 | Varghese et al. | |
| 4,661,265 A | 4/1987 | Olson et al. | |
| 4,665,261 A | 5/1987 | Mazurek | |
| 4,670,134 A | 6/1987 | Kolts et al. | 208/251 H |
| 4,729,826 A | 3/1988 | Lindsay et al. | 208/211 |
| 4,738,884 A | 4/1988 | Algrim et al. | 428/57 |
| 4,746,419 A | 5/1988 | Peck et al. | 208/213 |
| 4,810,365 A | 3/1989 | Dohler et al. | |
| 4,830,736 A | 5/1989 | Hung et al. | 208/251 H |
| 4,844,792 A | 7/1989 | Abdo et al. | 208/111 |
| 4,851,107 A | 7/1989 | Kretschmar et al. | 208/108 |
| 4,861,746 A | 8/1989 | Oishi et al. | 502/314 |
| 4,886,594 A | 12/1989 | Miller | 208/210 |
| 4,917,789 A | 4/1990 | Butler et al. | |
| 4,937,218 A * | 6/1990 | Ramirez de Aqudelo et al. | 502/152 |
| 4,937,221 A | 6/1990 | Erekson et al. | |
| 4,941,966 A | 7/1990 | Merz et al. | |
| 4,954,473 A | 9/1990 | Gatsis | |
| 4,976,848 A | 12/1990 | Johnson | |
| 4,992,157 A | 2/1991 | Bricker et al. | 208/12 |
| 4,992,163 A | 2/1991 | Aldridge et al. | 208/251 H |
| 5,002,919 A | 3/1991 | Yamazaki et al. | 502/315 |
| 5,017,535 A | 5/1991 | Schoonhoven et al. | 502/30 |
| 5,039,489 A | 8/1991 | Gleaves et al. | |
| 5,053,117 A | 10/1991 | Kyan et al. | 208/58 |
| 5,064,523 A | 11/1991 | Kretschmar et al. | |
| 5,089,463 A | 2/1992 | Johnson | 502/313 |
| 5,108,581 A | 4/1992 | Aldridge et al. | |
| 5,124,024 A | 6/1992 | Krzywicki et al. | |
| 5,124,027 A | 6/1992 | Beaton et al. | 208/309 |
| 5,164,078 A | 11/1992 | Hung et al. | |
| 5,166,118 A | 11/1992 | Kretschmar et al. | |
| 5,190,642 A | 3/1993 | Wilson et al. | 208/254 |
| 5,200,060 A | 4/1993 | Sajkowski et al. | 208/108 |
| 5,215,955 A | 6/1993 | Threlkel | 502/221 |
| 5,264,183 A | 11/1993 | Ebner et al. | |
| 5,288,681 A | 2/1994 | Gatsis | |
| 5,300,212 A | 4/1994 | Winter, Jr. | 208/67 |
| 5,300,217 A * | 4/1994 | Simpson et al. | 208/216 PP |
| 5,320,741 A | 6/1994 | Johnson et al. | |
| 5,322,617 A | 6/1994 | de Bruijn et al. | 208/108 |
| 5,334,307 A | 8/1994 | Simpson et al. | 208/254 H |
| 5,358,634 A | 10/1994 | Rankel | 208/251 |
| 5,374,350 A | 12/1994 | Heck et al. | 208/143 |
| 5,395,536 A | 3/1995 | Brown et al. | 210/727 |
| 5,397,456 A | 3/1995 | Dai et al. | 208/108 |
| 5,468,371 A | 11/1995 | Nelson et al. | 208/216 |
| 5,468,372 A * | 11/1995 | Seamans et al. | 208/216 |
| 5,474,977 A | 12/1995 | Gatsis | |
| 5,514,273 A | 5/1996 | Sherwood, Jr. et al. | 208/216 |
| 5,529,968 A | 6/1996 | Sudhakar et al. | |
| 5,601,701 A | 2/1997 | Cameron et al. | 208/251 H |
| 5,620,592 A | 4/1997 | Threlkel | |
| 5,635,056 A | 6/1997 | Brons et al. | 208/227 |
| 5,688,736 A * | 11/1997 | Seamans et al. | 502/219 |
| 5,744,025 A * | 4/1998 | Boon et al. | 208/253 |
| 5,817,229 A | 10/1998 | Sudhakar et al. | |
| 5,827,421 A | 10/1998 | Sherwood, Jr. | 208/112 |
| 5,847,249 A | 12/1998 | Maraschino | |
| 5,851,381 A | 12/1998 | Tanaka et al. | |
| 5,856,609 A | 1/1999 | Wu et al. | 585/489 |
| 5,871,626 A | 2/1999 | Crafts et al. | 204/297 R |
| 5,871,636 A | 2/1999 | Trachte et al. | |

| | | | |
|---|---|---|---|
| 5,885,441 A | 3/1999 | Pereira et al. | |
| 5,897,769 A * | 4/1999 | Trachte et al. | 208/263 |
| 5,914,030 A | 6/1999 | Bearden et al. | 208/263 |
| 5,916,529 A | 6/1999 | Scheuerman | 422/141 |
| 5,928,499 A | 7/1999 | Sherwood, Jr. et al. | 208/216 |
| 5,928,501 A | 7/1999 | Sudhakar et al. | |
| 5,928,502 A | 7/1999 | Bearden et al. | 208/263 |
| 5,942,101 A | 8/1999 | Greaney | 205/688 |
| 5,961,815 A | 10/1999 | Hockey et al. | |
| 6,037,300 A * | 3/2000 | Kasztelan et al. | 502/204 |
| 6,063,266 A | 5/2000 | Grande et al. | 208/263 |
| 6,086,749 A | 7/2000 | Kramer et al. | 208/213 |
| 6,136,179 A | 10/2000 | Sherwood, Jr. et al. | |
| 6,149,799 A | 11/2000 | Raybaud et al. | 208/49 |
| 6,162,350 A | 12/2000 | Soled et al. | 208/113 |
| 6,203,313 B1 | 3/2001 | Holmes et al. | |
| 6,203,695 B1 | 3/2001 | Harle et al. | 208/143 |
| 6,210,564 B1 | 4/2001 | Brons et al. | |
| 6,218,333 B1 | 4/2001 | Gtabrielov et al. | 502/216 |
| 6,248,230 B1 | 6/2001 | Min et al. | 208/213 |
| 6,277,269 B1 | 8/2001 | Myers et al. | 208/19 |
| 6,290,841 B1 | 9/2001 | Gabrielov et al. | 208/213 |
| 6,303,842 B1 | 10/2001 | Bridges et al. | 585/648 |
| 6,309,537 B1 | 10/2001 | Harle et al. | 208/254 H |
| 6,436,280 B1 | 8/2002 | Harle et al. | 208/216 R |
| 6,454,932 B1 | 9/2002 | Baldassari et al. | |
| 6,509,291 B2 | 1/2003 | Eijsbouts | |
| 6,524,469 B1 | 2/2003 | Schucker | |
| 6,547,957 B1 | 4/2003 | Sudhakar et al. | 208/111.01 |
| 6,554,994 B1 | 4/2003 | Reynolds et al. | 208/211 |
| 6,582,590 B1 | 6/2003 | Riley et al. | |
| 6,620,313 B1 | 9/2003 | Demmin et al. | |
| 6,635,599 B1 | 10/2003 | Soled et al. | |
| 6,652,738 B2 | 11/2003 | Eijsbouts et al. | |
| 6,660,897 B1 | 12/2003 | Marchal-George et al. | 585/482 |
| 6,783,663 B1 | 8/2004 | Riley et al. | 208/213 |
| 2001/0045375 A1 | 11/2001 | Thijssen et al. | 208/211 |
| 2002/0056664 A1 | 5/2002 | Chabot | |
| 2002/0112987 A1 | 8/2002 | Hou et al. | 208/108 |
| 2002/0125175 A1 | 9/2002 | Collins et al. | 208/263 |
| 2002/0155045 A1 | 10/2002 | Kumagai et al. | |
| 2003/0000867 A1 | 1/2003 | Reynolds | |
| 2003/0024854 A1 | 2/2003 | Wen et al. | |
| 2003/0042174 A1 | 3/2003 | Austin | |
| 2003/0062163 A1 | 4/2003 | Moulton et al. | |
| 2003/0070808 A1 | 4/2003 | Allison | |
| 2003/0070963 A1 | 4/2003 | Zimmermann et al. | |
| 2003/0085155 A1 | 5/2003 | Chabot | |
| 2003/0111391 A1 * | 6/2003 | Bhan | 208/253 |
| 2003/0130118 A1 | 7/2003 | Koyama et al. | |
| 2003/0149317 A1 | 8/2003 | Rendina | |
| 2003/0150778 A1 | 8/2003 | Haluska et al. | |
| 2003/0170873 A1 | 9/2003 | Ranson et al. | |
| 2003/0170874 A1 | 9/2003 | Ranson et al. | |
| 2003/0196884 A1 | 10/2003 | Dell'Orfano | |
| 2004/0106516 A1 * | 6/2004 | Schulz et al. | 502/313 |
| 2004/0182749 A1 * | 9/2004 | Domokos et al. | 208/213 |
| 2004/0235653 A1 * | 11/2004 | Domokos et al. | 502/309 |
| 2005/0139522 A1 | 6/2005 | Bhan et al. | 208/115 |
| 2005/0145543 A1 | 7/2005 | Bhan et al. | 208/115 |
| 2005/0155908 A1 | 7/2005 | Bhan et al. | 208/115 |
| 2005/0167320 A1 | 8/2005 | Bhan et al. | 208/14 |

FOREIGN PATENT DOCUMENTS

| | | | |
|---|---|---|---|
| CN | 1393516 | | 1/2003 |
| EP | 0159097 | | 10/1985 |
| EP | 0225686 | A1 | 6/1987 |
| EP | 0367021 | A1 | 5/1990 |
| EP | 0433026 | A1 | 6/1991 |
| EP | 0525259 | | 2/1993 |
| EP | 0537500 | A2 | 4/1993 |
| EP | 0569092 | A1 | 5/1993 |
| EP | 0567272 | | 10/1993 |
| EP | 0704239 | A2 | 9/1995 |
| EP | 0899319 | A2 | 3/1999 |
| EP | 1153107 | | 4/2003 |
| EP | 1350830 | A1 | 10/2003 |
| FR | 2546175 | | 11/1984 |
| GB | 496779 | | 12/1938 |
| GB | 934907 | | 8/1963 |
| GB | 1115122 | | 5/1968 |
| GB | 1232173 | | 5/1971 |
| GB | 1236230 | | 6/1971 |
| GB | 1310283 | | 3/1973 |
| GB | 1364238 | | 8/1974 |
| GB | 2013236 | | 8/1979 |
| GB | 2112412 | | 7/1983 |
| GB | 2167430 | | 5/1986 |
| GB | 2167430 | A | 5/1986 |
| JP | 54107906 | | 8/1979 |
| JP | 2002129171 | | 5/2002 |
| RU | 2186090 | | 7/2002 |
| WO | WO9302158 | | 2/1993 |
| WO | WO9708274 | | 3/1997 |
| WO | WO0018854 | | 4/2000 |
| WO | WO0020113 | | 4/2000 |
| WO | WO0044856 | | 8/2000 |
| WO | WO0209870 | | 2/2002 |
| WO | WO0232570 | | 4/2002 |
| WO | WO0233029 | | 4/2002 |
| WO | WO02053286 | | 7/2002 |
| WO | WO02062925 | | 8/2002 |
| WO | WO02100985 | | 12/2002 |
| WO | WO03042333 | | 5/2003 |
| WO | WO03091363 | A1 | 11/2003 |
| WO | WO03104359 | | 12/2003 |
| WO | WO2004053028 | | 6/2004 |
| WO | WO2005061666 | | 7/2005 |
| WO | WO2005085395 | | 9/2005 |

OTHER PUBLICATIONS

Dehkissia, S. et al, Characterization of Doba-Chad Heavy Crude Oil in Relation With the Feasibility of Pipeline Transportation, Fuel 83 (2004); pp. 2157-2168.

Sadeghi, K. M. et al, "Fractionation of Various Heavy Oils and Bitumen for Characterization Based on Polarity", Fuel, 1989, vol. 68, June; pp. 782-787.

"Refining Processes 2000", Hydrocarbon Processing, Gulf Publishing Co., Houston, Texas, 2000, pp. 87-142.

Brauer, ed. Handbook of Preparative Inorganic Chemistry, vol. 2., Second Edition, Academic Press Inc., New York, N.Y., 1965, p. 1507.

Nickless, ed., Inorganic Sulfur Chemistry, Elsevier, Amsterdam, 1968, pp. 669-747.

Heithaus, "Measurement and Significance of Asphaltene Peptization," Jounal of the Institute of Petroleum, 1962, vol. 48(458) pp. 45-53.

Speight, J.G. "Fuel Science and Technology Handbook, Chapter 3—Composition and Properties", New York, Marcel Dekker, US 1990, p. 115.

Platts-Methodology and Specifications Guide—Crude Oil, Latest Update Jun. 2007 (McGraw Hill); pp. 1-21.

Atanasova, P. et al (1997), Effect of Phosphorus Concentration and Method on Preparation on the Structure of the Oxide Form of Phosphorus-nickel-tungsten/alumina Hydrotreating Catalysts, Applied Catalysts A, 161, pp. 105-119.

Giles, H. N. (2003), Significance of Tests for Petroleum Products (7$^{th}$ Ed.) Rand, S. J., ASTM International, 258 pgs.

Gary, J. H. et al (2001), Petroleum Refining Technology and Economics, 4th Ed., Marcel Dekker, 441 pages.

Aboul-Seoud, A-L et al, (1999), "A Generalized Viscosity Correlation for Undefined Petroleum Fraction", Chemical Engineering Journal 72, pp. 253-256.

Tojima, M. et al (1998), "Effect of Heavy Asphaltenes on Stability of Residual Oil", Catalysis Today, 43, p. 347-351.

Pages 210-213 of the handbook titled "Advanced Inorganic Chemistry" by Cotton et al., John Wiley & Sons, 1988.

Pages 1-4 of Wikipedia on Aluminium Oxide on Jan. 20, 2009.

* cited by examiner

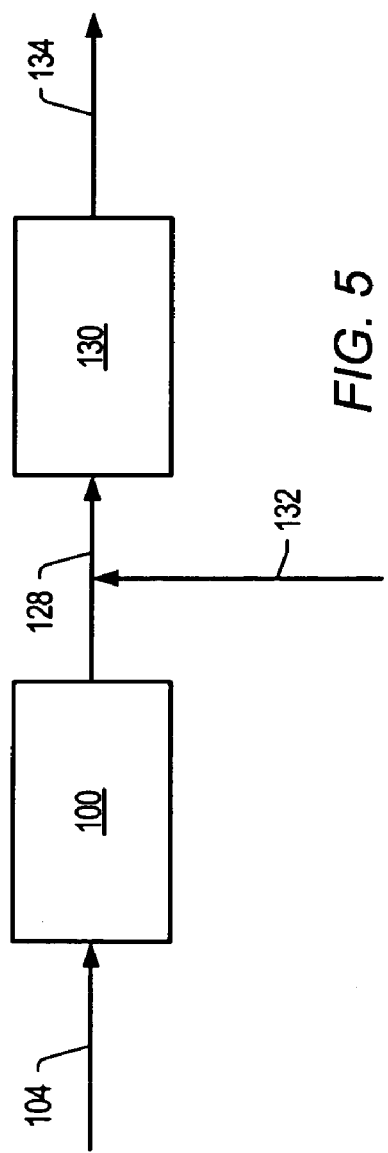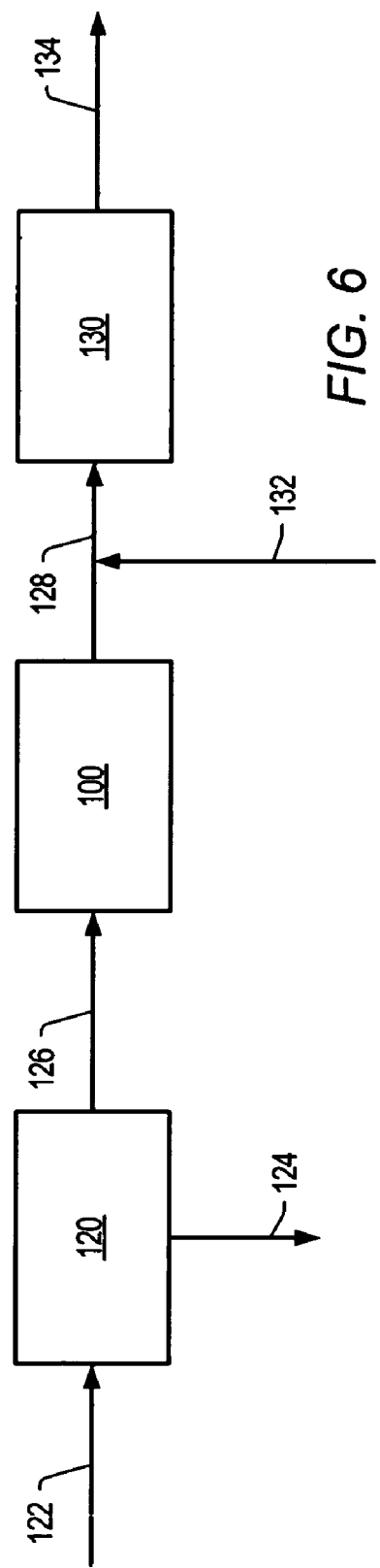

SYSTEMS, METHODS, AND CATALYSTS FOR PRODUCING A CRUDE PRODUCT

CROSS-REFERENCE TO RELATED APPLICATIONS

This application claims priority to U.S. Provisional Application 60/670,137 filed on Apr. 11, 2005, herein incorporated by reference in its entirety.

FIELD OF THE INVENTION

The present invention generally relates to systems, methods, and catalysts for treating crude feed. More particularly, certain embodiments described herein relate to systems, methods, and catalysts for conversion of a crude feed to a total product, wherein the total product includes a crude product that is a liquid mixture at 25° C. and 0.101 MPa, and has one or more properties that are changed relative to the respective property of the crude feed.

DESCRIPTION OF RELATED ART

Crudes that have one or more unsuitable properties that do not allow the crudes to be economically transported, or processed using conventional facilities, are commonly referred to as "disadvantaged crudes".

Disadvantaged crudes may include acidic components that contribute to the total acid number ("TAN") of the crude feed. Disadvantaged crudes with a relatively high TAN may contribute to corrosion of metal components during transporting and/or processing of the disadvantaged crudes. Removal of acidic components from disadvantaged crudes may involve chemically neutralizing acidic components with various bases. Alternately, corrosion-resistant metals may be used in transportation equipment and/or processing equipment. The use of corrosion-resistant metal often involves significant expense, and thus, the use of corrosion-resistant metal in existing equipment may not be desirable. Another method to inhibit corrosion may involve addition of corrosion inhibitors to disadvantaged crudes before transporting and/or processing of the disadvantaged crudes. The use of corrosion inhibitors may negatively affect equipment used to process the crudes and/or the quality of products produced from the crudes.

Disadvantaged crudes often contain relatively high levels of residue. Disadvantaged crudes having high levels of residue tend to be difficult and expensive to transport and/or process using conventional facilities.

Disadvantaged crudes often contain organically bound heteroatoms (for example, sulfur, oxygen, and nitrogen). Organically bound heteroatoms may, in some situations, have an adverse effect on catalysts used to process disadvantaged crudes.

Disadvantaged crudes may include relatively high amounts of metal contaminants, for example, nickel, vanadium, and/or iron. During processing of such crudes, metal contaminants and/or compounds of metal contaminants, may deposit on a surface of the catalyst or in the void volume of the catalyst. Such deposits may cause a decline in the activity of the catalyst.

Disadvantaged crudes may have components that contribute coke and/or to thermal to degradation of the disadvantaged crude. The coke and/or thermally degraded components may form and/or deposit on catalyst surfaces at a rapid rate during processing of disadvantaged crudes. It may be costly to regenerate the catalytic activity of a catalyst contaminated with coke and/or thermally degraded crude. Additionally, high temperatures used during regeneration of a catalyst may also diminish the activity of the catalyst and/or cause the catalyst to deteriorate.

Disadvantaged crudes may include metals (for example, calcium, potassium and/or sodium) in metal salts of organic acids. Metals in metal salts of organic acids are not typically separated from disadvantaged crudes by conventional production processing, for example, desalting and/or acid washing.

Problems are often encountered in conventional catalytic processing of crudes when metals in metal salts of organic acids are present. In contrast to nickel and vanadium, which typically deposit near the external surface of the catalyst, metals in metal salts of organic acids may deposit preferentially in void volumes between catalyst particles, particularly at the top of the catalyst bed. The deposit of contaminants, for example, metals in metal salts of organic acids, at the top of the catalyst bed, generally results in an increase in pressure drop through the bed and may effectively plug the bed. Moreover, the metals in metal salts of organic acids may cause rapid deactivation of catalysts.

Disadvantaged crudes may include organic oxygen compounds. Treatment facilities that process disadvantaged crudes with an oxygen content of at least 0.002 grams of oxygen per gram of disadvantaged crude may encounter problems during processing. Organic oxygen compounds, when heated during processing, may form higher oxidation compounds (for example, ketones and/or acids formed by oxidation of alcohols, and/or acids formed by oxidation of ethers) that are difficult to remove from the treated crude and/or may corrode/contaminate equipment during processing and cause plugging in transportation lines.

Disadvantaged crudes may include hydrogen deficient hydrocarbons. When processing hydrogen deficient hydrocarbons, consistent quantities of hydrogen generally need to be added, particularly if unsaturated fragments resulting from cracking processes are produced. Hydrogenation during processing, which typically involves the use of an active hydrogenation catalyst, may be needed to inhibit unsaturated fragments from forming coke. Hydrogen is costly to produce and/or costly to transport to treatment facilities.

Disadvantaged crudes also tend to exhibit instability during processing in conventional facilities. Crude instability tends to result in phase separation of components during processing and/or formation of undesirable by-products (for example, hydrogen sulfide, water, and carbon dioxide).

Conventional processes for treating disadvantaged crudes may reduce the amount of components that contribute to high viscosity, thermal degradation of the disadvantaged crude, and/or coking. Removal of these components, however, may cause instability in the crude, thus causing separation of the crude during transportation. During conventional processing, components that contribute to high viscosity and/or coking are typically removed when the crude is treated with a catalyst that has a large pore size, a high surface area, and a low hydrotreating activity. The resulting crude may then be further treated to remove other unwanted components in the crude.

Some processes for improving the quality of crude include adding a diluent to disadvantaged crudes to lower the weight percent of components contributing to the disadvantaged properties. Adding diluent, however, generally increases costs of treating disadvantaged crudes due to the costs of diluent and/or increased costs to handle the disadvantaged crudes. Addition of diluent to a disadvantaged crude may, in some situations, decrease stability of such crude.

U.S. Pat. Nos. 6,547,957 to Sudhakar et al.; 6,277,269 to Myers et al.; 6,203,695 to Harle et al.; 6,063,266 to Grande et al.; 5,928,502 to Bearden et al.; 5,914,030 to Bearden et al.; 5,897,769 to Trachte et al.; 5,744,025 to Boon et al.; 4,212,729 to Hensley, Jr., and 4,048,060 to Riley; and U.S. Patent Application Publication No. US 2004/0106516 to Schulz et al. describe various processes, systems, and catalysts for processing crudes. The processes, systems, and catalysts described in these patents, however, have limited applicability because of many of the technical problems set forth above.

In sum, disadvantaged crudes generally have undesirable properties (for example, relatively high TAN, a tendency to become unstable during treatment, and/or a tendency to consume relatively large amounts of hydrogen during treatment). Disadvantaged crudes may also include relatively high amounts of undesirable components (for example, components that contribute to thermal degradation, residue, organically bound heteroatoms, metal contaminants, metals in metal salts of organic acids, and/or organic oxygen compounds). Such properties and components tend to cause problems in conventional transportation and/or treatment facilities, including increased corrosion, decreased catalyst life, process plugging, and/or increased usage of hydrogen during treatment. Thus, there is a significant economic and technical need for improved systems, methods, and/or catalysts for conversion of disadvantaged crudes into crude products with more desirable properties. There is also a significant economic and technical need for systems, methods, and/or catalysts that can change selected properties in a disadvantaged crude while minimizing changes to other properties in the disadvantaged crude.

SUMMARY OF THE INVENTION

In some embodiments, the invention provides a method of producing a crude product, comprising: contacting a crude feed with one or more catalysts to produce a total product that includes the crude product, wherein the crude product is a liquid mixture at 25° C. and 0.101 MPa; the crude feed has a micro-carbon residue ("MCR") content of at least 0.0001 grams per gram of crude feed; and at least one of the catalysts is a Column 6 metal catalyst that comprises: one or more metals from Column 6 of the Periodic Table and/or one or more compounds of one or more metals from Column 6 of the Periodic Table; a pore size distribution with a median pore diameter of greater than 110 Å; and a pore volume in which pores having a pore diameter of at least 350 Å provide at most 10% of the pore volume, wherein pore volume and pore diameter are as determined by ASTM Method D4284; and controlling contacting conditions such that the crude product has a MCR content of at most 90% of the MCR content of the crude feed, wherein MCR content is as determined by ASTM Method D4530.

In some embodiments, the invention also provides a catalyst, comprising: a support; and one or more metals from Column 6 of the Periodic Table and/or one or more compounds of one or more metals from Column 6 of the Periodic Table; wherein the catalyst has a pore size distribution with a median pore diameter greater than 110 Å and a pore volume in which pores having a pore diameter of at least 350 Å provide at most 10% of the pore volume, wherein pore diameter and pore volume are as determined by ASTM Method D4284.

In some embodiments, the invention also provides a method of making a catalyst, comprising: combining a support with a metal solution comprising one or more metals from Column 6 of the Periodic Table and/or one or more compounds of one or more metals from Column 6 of the Periodic Table, wherein the support has an average pore diameter of at least 90 Å and a pore volume in which pores having a pore diameter of at least 350 Å to provide at most 15% of the pore volume of the support, wherein pore diameter and pore volume are as determined by ASTM Method D4284.

In some embodiments, the invention also provides a method of producing a crude product, comprising: contacting a crude feed with one or more catalysts to produce a total product that includes the crude product, wherein the crude product is a liquid mixture at 25° C. and 0.101 MPa, the crude feed has a MCR content of at least 0.0001 grams per gram of crude feed, and at least one of the catalysts is a Columns 6-10 catalyst that has, per gram of catalyst, at least 0.3 grams of one or more metals from Columns 6-10 of the Periodic Table and/or one or more compounds of one or more metals from Columns 6-10 of the Periodic Table; and a binder; and controlling contacting conditions such that the crude product has a MCR content of at most 90% of the MCR content of the crude feed, wherein MCR content is as determined by ASTM Method D4530.

In some embodiments, the invention also provides a method of producing a crude product, comprising: contacting a crude feed with one or more catalysts to produce a total product that includes the crude product, wherein the crude product is a liquid mixture at 25° C. and 0.101 MPa, the crude feed comprises one or more alkali metal salts of one or more organic acids, alkaline-earth metal salts of one or more organic acids, or mixtures thereof, the crude feed has, per gram of crude feed, a total content of alkali metal and alkaline-earth metal in metal salts of organic acids of at least 0.00001 grams, and at least one of the catalysts is a Columns 5-10 metal catalyst that comprises: a support, the support comprising theta alumina; and one or more metals from Columns 5-10 of the Periodic Table and/or one or more compounds of one or more metals from Columns 5-10 of the Periodic Table; and controlling contacting conditions such that the crude product has a total content of alkali metal and alkaline-earth metal in metal salts of organic acids of at most 90% of the content of alkali metal and alkaline-earth metal in metal salts of organic acids in the crude feed, wherein content of alkali metal and alkaline-earth metal in metal salts of organic acids is as determined by ASTM Method D1318.

In some embodiments, the invention also provides a method of producing a crude product, comprising: contacting a crude feed with one or more catalysts to produce a total product that includes the crude product, wherein the crude product is a liquid mixture at 25° C. and 0.101 MPa; the crude feed has a nitrogen content of at least 0.0001 grams per gram of crude feed; and at least one of the catalysts is a Column 6 metal catalyst that comprises: one or more metals from Column 6 of the Periodic Table and/or one or more compounds of one or more metals from Column 6 of the Periodic Table; a pore size distribution with a median pore diameter of greater than 110 Å; and a pore volume in which pores having a pore diameter of at least 350 Å provide at most 10% of the pore volume, wherein pore diameter and pore volume are as determined by ASTM Method D4284; and controlling contacting conditions such that the crude product has a nitrogen content of at most 90% of the nitrogen content of the crude feed, wherein nitrogen content is as determined by ASTM Method D5762.

In some embodiments, the invention also provides a method of producing a crude product, comprising: contacting a crude feed with one or more catalysts to produce a total product that includes the crude product, wherein the crude product is a liquid mixture at 25° C. and 0.101 MPa; the crude feed has a nitrogen content of at least 0.0001 grams per gram of crude feed; wherein at least one of the catalysts is a Column 6 metal catalyst that is obtainable by heating a Column 6 metal catalyst precursor in the presence of one or more sulfur containing compounds at a temperature below about 500° C., wherein the Column 6 metal catalyst precursor comprises: one or more metals from Column 6 of the Periodic Table and/or one or more compounds of one or more metals from Column 6 of the Periodic Table; and a support; and controlling contacting conditions such that the crude product has a nitrogen content of at most 90% of the nitrogen content of the crude feed, wherein nitrogen content is as determined by ASTM Method D5762.

In some embodiments, the invention also provides, in combination with one or more of the above embodiments, the Column 6 metal catalyst: (a) in which pores having a pore diameter of at least 350 Å provide at most 5%, at most 3%, at most 1%, or at most 0.5% of the pore volume; (b) has a pore size distribution with a median pore diameter of at least 120 Å, at least 130 Å, at least 150 Å, at least 180 Å, at least 200 Å, at least 250 Å, or at most 300 Å, wherein pore size distribution is as determined by ASTM Method D4284; and/or (c) has a pore size distribution such that at least 60% of the total number of pores in the pore size distribution are within about 45 Å, about 35 Å, or about 25 Å of the median pore diameter of the pore size distribution.

In some embodiments, the invention also provides, in combination with one or more of the above embodiments, that the Column 6 metal catalyst: (a) has, per gram of catalyst, from about 0.0001 grams to about 0.3 grams, about 0.005 grams to about 0.2 grams, or about 0.01 grams to about 0.1 grams of one or more of the Column 6 metals and/or one or more of the Column 6 metal compounds, calculated as total weight of to Column 6 metal; (b) comprises one or more metals from Columns 7-10 of the Periodic Table and/or one or more compounds of one or more metals from Columns 7-10 of the Periodic Table; and has, per gram of catalyst, from about 0.001 grams to about 0.1 grams or about 0.01 grams to about 0.05 grams of one or more of the Columns 7-10 metals and/or one or more of the Columns 7-10 metal compounds, calculated as total weight of Columns 7-10 metals; (c) comprises one or more metals from Column 10 of the Periodic Table and/or one or more compounds of one or more metals from Column 10 of the Periodic Table; (d) comprises molybdenum and/or tungsten; (e) comprises nickel and/or cobalt; (f) comprises nickel and/or iron; (g) comprises one or more elements from Column 15 of the Periodic Table and/or one or more compounds of one or more elements from Column 15 of the Periodic Table; and has, per gram of catalyst, from about 0.000001 grams to about 0.1 grams, about 0.00001 grams to about 0.06 grams, about 0.00005 grams to about 0.03 grams, or about 0.0001 grams to about 0.001 grams of one or more of the Column 15 elements and/or one or more of the Column 15 element compounds, calculated as total weight of Column 15 element; (h) comprises phosphorus; and/or (i) has, per gram of catalyst, at most 0.001 grams of one or more metals from Column 5 of the Periodic Table and/or one or more compounds of one or more metals from Column 5 of the Periodic Table, calculated as total weight of Column 5 metal.

In some embodiments, the invention also provides, in combination with one or more of the above embodiments, that the Column 6 metal catalyst or Column 6 metal solution has, per gram of catalyst or Column 6 metal solution: (a) from about 0.01 grams to about 0.15 grams of molybdenum and/or one or more compounds of molybdenum, calculated as total weight of molybdenum; and from about 0.001 grams to about 0.05 grams of nickel and/or one or more compounds of nickel, calculated as total weight of nickel; and (b) optionally, from about 0.001 grams to about 0.05 grams of iron and/or one or more compounds of iron, calculated as total weight of iron; and (c) optionally, from about 0.0001 grams to about 0.05 grams of phosphorus and/or one or more compounds of phosphorus, calculated as total weight of phosphorus.

In some embodiments, the invention also provides, in combination with one or more of the above embodiments, that the Columns 5-10 metal catalyst: (a) comprises molybdenum; (b) comprises tungsten; (c) comprises vanadium; (d) has, per gram of catalyst, from about 0.001 grams to about 0.1 grams or about 0.01 grams to about 0.05 grams of one or more metals from Columns 7-10 of the Periodic Table and/or one or more to compounds of one or more metals from Columns 7-10 of the Periodic Table; (e) comprises one or more elements from Column 15 of the Periodic Table and/or one or more compounds of one or more elements from Column 15 of the Periodic Table; (f) comprises phosphorus; and/or (g) has a pore size distribution with a median pore diameter of at least 180 Å, at least 200 Å, at least 230 Å, at least 250 Å, or at least 300 Å.

In some embodiments, the invention also provides, in combination with one or more of the above embodiments, that the Column 6 metal catalyst is a supported catalyst, in which the support has, per gram of support: (a) at least 0.8 grams, at least 0.9 grams, or at least 0.95 grams of gamma alumina; (b) at most 0.1 grams, at most 0.08 grams, at most 0.06 grams, at most 0.04 grams, or at most 0.02 grams of silica, or (c) at least 0.3 grams or at least 0.5 grams of theta alumina.

In some embodiments, the invention also provides, in combination with one or more of the above embodiments, contacting the crude feed with one or more catalysts in which at least one or more of the catalysts is a Column 6 metal catalyst that is obtainable by combining a mixture with one or more of the Column 6 metals and/or one or more of the Column 6 metal compounds, and the mixture comprises: one or more metals from Columns 7-10 of the Periodic Table and/or one or more compounds of one or more metals from Columns 7-10 of the Periodic Table; and a support. In some embodiments, in combination with one or more of the above embodiments, at least one of the Columns 7-10 metals comprises nickel, cobalt, iron, or mixtures thereof.

In some embodiments, the invention also provides, in combination with one or more of the above embodiments, a crude feed that has: (a) from about 0.0001 grams to about 0.5 grams, about 0.005 grams to about 0.1 grams, or about 0.01 grams to about 0.05 grams of MCR per gram of crude feed; (b) from about 0.0001 grams to about 0.1 grams, about 0.001 grams to about 0.05 grams, or about 0.005 grams to about 0.01 grams of nitrogen per gram of crude feed; and/or (c) from about 0.00001 grams to about 0.005 grams, about 0.00005 grams to about 0.05 grams, or about 0.0001 grams to about 0.01 grams of alkali metal and alkaline-earth metal in metal salts of organic acids per gram of crude feed.

In some embodiments, the invention also provides, in combination with one or more of the above embodiments, a crude product that has: (a) a MCR content of at most 80%, at most 50%, at most 30%, or at most 10% of the MCR content of the crude feed; (b) a nitrogen content of at most 80%, at most 50%, at most 30%, or at most 10% of the nitrogen content of the crude feed; (c) a total content of alkali metal and alkaline-earth metal in metal salts of organic acids in the crude product of at most 80%, at most 50%, at most 30%, or at most 10% of the content of alkali metal, and alkaline-earth metal, in metal salts of organic acids in the crude feed; (d) a MCR content in a range from about 0.1% to about 75%, about 0.5% to about 45%, about 1% to about 25%, or about 2% to about 9% of the MCR content of the crude feed; (e) a nitrogen content in a range from about 0.1% to about 75%, about 0.5% to about 45%, about 1% to about 25%, or about 2% to about 9% of the nitrogen content of the crude feed; (f) a total content of alkali metal and alkaline-earth metal in metal salts of organic acids in the crude product in a range from about 0.1% to about 75%, from about 0.5% to about 45%, about 1% to about 25%, or about 2% to about 9% of the content of alkali metal and alkaline-earth metal in metal salts of organic acids in the crude feed; (g) from about 0.00001 grams to about 0.1 grams, about 0.0001 grams to about 0.05 grams, or about 0.001 grams to about 0.005 grams of MCR per gram of crude product; (h) from about 0.00001 grams to about 0.05 grams, about 0.0001 grams to about 0.01 grams, or about 0.0005 grams to about 0.001 grams of nitrogen per gram of crude product; (i) from about $1\times10^{-7}$ grams to about $5\times10^{-5}$ grams, about $5\times10^{-7}$ grams to about $1\times10^{-5}$ grams, or about $1\times10^{-6}$ grams to about $5\times10^{-6}$ grams of alkali metal and alkaline-earth metal in metal salts of organic acids per gram of crude product; (j) a viscosity at 37.8° C. (100° F.) of at most 90%, at most 80%, at most 70%, at most 50%, at most 30%, or at most 10% of the viscosity at 37.8° C. (100° F.) of the crude feed, wherein viscosity is as determined by ASTM Method D445; (k) a $C_5$ asphaltenes content of most 90%, at most 80%, at most 70%, at most 50%, at most 30%, or at most 10% of the $C_5$ asphaltenes content of the crude feed, wherein $C_5$ asphaltenes content is as determined by ASTM Method D2007; (1) a residue content of at most 90%, at most 80%, at most 70%, at most 50%, at most 30%, or at most 10% of the residue content of the crude feed, wherein residue content is as determined by ASTM Method D5307; and/or (m) a sulfur content of at most 90%, at most 80%, at most 70%, at most 50%, at most 30%, or at most 10% of the sulfur content of the crude feed, wherein sulfur content is as determined by ASTM Method D4294.

In some embodiments, the invention also provides, in combination with one or more of the above embodiments, contacting the crude feed with one or more catalysts and one or more additional catalysts, at least one of the catalysts is the Column 6 metal catalyst, and one or more of the additional catalysts has a median pore diameter of at least 60 Å, at to least 90 Å, at least 110 Å, at least 180 Å, at least 200 Å, or at least 250 Å; and the Column 6 metal catalyst is contacted with the crude feed prior to and/or after contact of the crude feed with at least one of the additional catalysts.

In some embodiments, the invention also provides, in combination with one or more of the above embodiments, at least one of the catalysts is the Columns 5-10 metal catalyst; and contacting the crude feed with an additional catalyst having a median pore diameter of at least 60 Å, and the additional catalyst is contacted with the crude feed subsequent to contact of the crude feed with the Columns 5-10 metal catalyst.

In some embodiments, the invention also provides, in combination with one or more of the above embodiments, contacting the crude feed with one or more catalysts to produce a total product in which, during contact, a crude feed/total product mixture has a P-value of at least 1.5.

In some embodiments, the invention also provides, in combination with one or more of the above embodiments, contacting in the presence of a hydrogen source.

In some embodiments, the invention also provides, in combination with one or more of the above embodiments, the contacting conditions which comprise: (a) a temperature within the range of about 50° C. to about 500° C.; (b) a temperature of at most 430° C., at most 420° C., or at most 410° C.; (c) a total pressure within a range of about 0.1 MPa to about 20 MPa; (d) a total pressure of at most 18 MPa, at most 16 MPa, or at most 14 MPa; (e) a liquid hourly space velocity of at least 0.05 $h^{-1}$; and/or (f) a ratio of a gaseous hydrogen source to the crude feed in a range from about 0.1 $Nm^3/m^3$ to about 100,000 $Nm^3/m^3$.

In some embodiments, the invention also provides, in combination with one or more of the above embodiments, a method that comprises contacting a crude feed with one or more catalysts to produce a total product that includes a crude product, the method further comprising combining the crude product with a crude that is the same as or different from the crude feed to form a blend suitable for transporting.

In some embodiments, the invention provides, in combination with one or more of the above embodiments, a method of making a catalyst that includes combining a support with a Column 6 metal solution: (a) that has a pH of up to about 3; (b) that has a pH in a range from about 1 to about 3; (c) in which an amount of Column 6 metal in the metal solution is selected such that the catalyst has, per gram of catalyst, from about 0.0001 grams to about 0.3 grams, about 0.005 grams to about 0.2 grams, or about 0.01 grams to to about 0.1 grams of one or more of the Column 6 metals and/or one or more of the Column 6 metal compounds, calculated as total weight of Column 6 metal; (d) that comprises one or more metals from Columns 7-10 of the Periodic Table and/or one or more compounds of one or more metals from Columns 7-10 of the Periodic Table; and where an amount of Columns 7-10 metals is selected such that the catalyst has, per gram of catalyst, from about 0.001 grams to about 0.1 grams or about 0.01 grams to about 0.05 grams of one or more of the Columns 7-10 metals and/or one or more of the Columns 7-10 metal compounds, calculated as total weight of Columns 7-10 metals; (e) that comprises one or more metals from Column 10 of the Periodic Table and/or one or more compounds of one or more metals from Column 10 of the Periodic Table; (f) that comprises molybdenum and/or tungsten; (g) that comprises nickel and/or cobalt; (h) that comprises nickel and iron; (i) that comprises one or more elements from Column 15 of the Periodic Table and/or one or more compounds of one or more elements from Column 15 of the Periodic Table; and where an amount of Columns 15 elements is selected such that the catalyst has, per gram of catalyst, from about 0.000001 grams to about 0.1 grams, about 0.00001 grams to about 0.06 grams, about 0.00005 grams to about 0.03 grams, or about 0.0001 grams to about 0.001 grams of one or more of the Column 15 elements and/or one or more of the Column 15 element compounds, calculated as total weight of Column 15 element; (j) that comprises phosphorus; (k) that comprises one or more mineral acids; (l) that comprises one or more organic acids; (m) that comprises hydrogen peroxide; and/or (n) that comprises an amine.

In some embodiments, the invention provides, in combination with one or more of the above embodiments, a method of making a catalyst that includes: heat-treating the supported metal at a temperature in a range from about 40° C. to about 400° C., about 60° C. to about 300° C., or about 100° C. to about 200° C.; and optionally further heat-treating the supported metal at a temperature of at least 400° C.

In some embodiments, the invention provides, in combination with one or more of the above embodiments, a Columns 6-10 metal catalyst: (a) that comprises one or more metals from Column 6 of the Periodic Table and/or one or more compounds of one or more metals from Column 6 of the Periodic Table; (b) that comprises one or more metals from Columns 7-10 of the Periodic Table and/or one or more compounds of one or more metals from Columns 7-10 of the Periodic Table; (c) that comprises molybdenum and/or tungsten; (d) that comprises nickel and/or cobalt; (e) in which the binder comprises silica, alumina, to silica/alumina, titanium oxide, zirconium oxide, or mixtures thereof; and/or (f) that is amorphous.

In further embodiments, features from specific embodiments may be combined with features from other embodiments. For example, features from one embodiment may be combined with features from any of the other embodiments.

In further embodiments, crude products are obtainable by any of the methods and systems described herein.

In further embodiments, additional features may be added to the specific embodiments described herein.

In further embodiments, transportation fuels, heating fuel, lubricants, or chemicals are obtainable from a crude product or a blend obtained by any of the methods and system described herein.

BRIEF DESCRIPTION OF THE DRAWINGS

Advantages of the present invention will become apparent to those skilled in the art with the benefit of the following detailed description and upon reference to the accompanying drawings in which:

FIG. 5 is a schematic of an embodiment of a blending zone in combination with a contacting system.

FIG. 6 is a schematic of an embodiment of a combination of a separation zone, a contacting system, and a blending zone.

Figure 1:
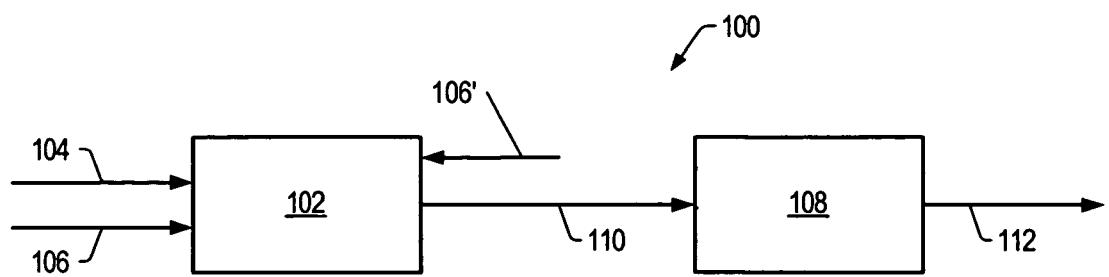
FIG. 1 is a schematic of an embodiment of a contacting system.

While the invention is susceptible to various modifications and alternative forms, specific embodiments thereof are shown by way of example in the drawings. The drawings may not be to scale. It should be understood that the drawings and detailed description thereto are not intended to limit the invention to the particular form disclosed, but on the contrary, the intention is to cover all modifications, equivalents and alternatives to falling within the spirit and scope of the present invention as defined by the appended claims.

DETAILED DESCRIPTION

The above problems may be addressed using systems, methods, and catalysts described herein. For example, the crude product having reduced MCR content and/or a reduced nitrogen content relative to the MCR content and/or the nitrogen content of the crude feed is produced by contacting the crude feed with the catalyst that has a pore size distribution with a median pore diameter of greater than 110 Å, and a pore volume in which pores having a pore diameter of at least 350 Å provide at most 10% of the pore volume. Crude product having reduced nitrogen content relative to the nitrogen content of the crude feed is produced by contacting the crude feed with the uncalcined catalyst. Crude product having reduced content of metals in metal salts of organic acids relative to the content of metals in metal salts of organic acids of the crude feed is produced by contacting the crude feed with the catalyst that includes Columns 5-10 metal(s) and theta alumina. Crude product having reduced MCR content relative to the MCR content of the crude feed is produced by contacting the crude feed with the bulk metal catalyst.

U.S. application Ser. Nos. 11/014,335; 11/013,553; 11/014,386; 11/013,554; 11/013,629; 11/014,318; 11/013,576; 11/013,835; 11/014,362; 11/014,011; 11/013,747; 11/013,918; 11/014,275; 11/014,060; 11/014,272; 11/014,380; 11/014,005; 11/013,998; 11/014,406; 11/014,365; 11/013,545; 11/014,132; 11/014,363; 11/014,251; 11/013,632; 11/014,009; 11/014,297; 11/014,004; 11/013,999; 11/014,281; 11/013,995; 11/013,904, 11/013,952; 11/014,299; 11/014,381; 11/014,346; 11/014,028; 11/013,826; and 11/013,622 also discuss systems, methods, and catalysts that address the above problems, albeit with respect to crude feeds that may differ in some respects from the crude feeds treated in accordance with the inventions described herein.

Certain embodiments of the inventions are described herein in more detail. Terms used herein are defined as follows.

"ASTM" refers to American Standard Testing and Materials.

"API gravity" refers to API gravity at 15.5° C. (60° F.). API gravity is as determined by ASTM Method D6822.

Atomic hydrogen percentage and atomic carbon percentage of the crude feed and the crude product are as determined by ASTM Method D5291.

Boiling range distributions for the crude feed, the total product, and/or the crude product are as determined by ASTM Method D5307 unless otherwise mentioned.

"Binder" refers to a substrate that combines smaller particles together to form larger substances (for example, blocks or pellets).

"Bulk metal catalyst" refers to a catalyst that includes at least one metal, and does not require a carrier or a support.

"$C_5$ asphaltenes" refers to asphaltenes that are insoluble in pentane. $C_5$ asphaltenes content is as determined by ASTM Method D2007.

"Column X metal(s)" refers to one or more metals of Column X of the Periodic Table and/or one or more compounds of one or more metals of Column X of the Periodic Table, in which X corresponds to a column number (for example, 1-12) of the Periodic Table. For example, "Column 6 metal(s)" refers to one or more metals from Column 6 of the Periodic Table and/or one or more compounds of one or more metals from Column 6 of the Periodic Table.

"Column X element(s)" refers to one or more elements of Column X of the Periodic Table, and/or one or more compounds of one or more elements of Column X of the Periodic Table, in which X corresponds to a column number (for example, 13-18) of the Periodic Table. For example, "Column 15 element(s)" refers to one or more elements from Column 15 of the Periodic Table and/or one or more compounds of one or more elements from Column 15 of the Periodic Table.

In the scope of this application, weight of a metal from the Periodic Table, weight of a compound of a metal from the Periodic Table, weight of an element from the Periodic Table, or weight of a compound of an element from the Periodic Table is calculated as the weight of metal or the weight of element. For example, if 0.1 grams of $MoO_3$ is used per gram of catalyst, the calculated weight of the molybdenum metal in the catalyst is 0.067 grams per gram of catalyst.

"Content" refers to the weight of a component in a substrate (for example, a crude feed, a total product, or a crude product) expressed as weight fraction or weight percentage based on the total weight of the substrate. "Wtppm" refers to parts per million by weight.

"Crude feed/total product mixture" refers to the mixture that contacts the catalyst during processing.

"Distillate" refers to hydrocarbons with a boiling range distribution between 204° C. (400° F.) and 343° C. (650° F.) at 0.101 MPa. Distillate content is as determined by ASTM Method D5307.

"Heteroatoms" refers to oxygen, nitrogen, and/or sulfur contained in the molecular structure of a hydrocarbon. Heteroatoms content is as determined by ASTM Methods E385 for oxygen, D5762 for total nitrogen, and D4294 for sulfur. "Total basic nitrogen" refers to nitrogen compounds that have a pKa of less than 40. Basic nitrogen ("bn") is as determined by ASTM Method D2896.

"Hydrogen source" refers to hydrogen, and/or a compound and/or compounds that when in the presence of a crude feed and a catalyst react to provide hydrogen to compound(s) in the crude feed. A hydrogen source may include, but is not limited to, hydrocarbons (for example, $C_1$ to $C_4$ hydrocarbons such as methane, ethane, propane, butane), water, or mixtures thereof. A mass balance may be conducted to assess the net amount of hydrogen provided to the compound(s) in the crude feed.

"Flat plate crush strength" refers to compressive force needed to crush a catalyst. Flat plate crush strength is as determined by ASTM Method D4179.

"LHSV" refers to a volumetric liquid feed rate per total volume of catalyst, and is expressed in hours ($h^{-1}$). Total volume of catalyst is calculated by summation of all catalyst volumes in the contacting zones, as described herein.

"Liquid mixture" refers to a composition that includes one or more compounds that are liquid at standard temperature and pressure (25° C., 0.101 MPa, hereinafter referred to as "STP"), or a composition that includes a combination of one of more compounds that are liquid at STP with one or more compounds that are solids at STP.

"Periodic Table" refers to the Periodic Table as specified by the International Union of Pure and Applied Chemistry (IUPAC), November 2003.

"Metals in metal salts of organic acids" refer to alkali metals, alkaline-earth metals, zinc, arsenic, chromium, or combinations thereof. A content of metals in metal salts of organic acids is as determined by ASTM Method D1318.

"MCR" content refers to a quantity of carbon residue remaining after evaporation and pyrolysis of a substrate. MCR content is as determined by ASTM Method D4530.

"Naphtha" refers to hydrocarbon components with a boiling range distribution between 38° C. (100° F.) and 200° C. (392° F.) at 0.101 MPa. Naphtha content is as determined by ASTM Method D5307.

"Ni/V/Fe" refers to nickel, vanadium, iron, or combinations thereof.

"Ni/V/Fe content" refers to the content of nickel, vanadium, iron, or combinations thereof. The Ni/V/Fe content is as determined by ASTM Method D5708.

"$Nm^3/m^3$" refers to normal cubic meters of gas per cubic meter of crude feed.

"Non-carboxylic containing organic oxygen compounds" refers to organic oxygen compounds that do not have a carboxylic (—$CO_2$—) group. Non-carboxylic containing organic oxygen compounds include, but are not limited to, ethers, cyclic ethers, alcohols, aromatic alcohols, ketones, aldehydes, or combinations thereof, which do not have a carboxylic group.

"Non-condensable gas" refers to components and/or mixtures of components that are gases at STP.

"P (peptization) value" or "P-value" refers to a numeral value, which represents the flocculation tendency of asphaltenes in the crude feed. Determination of the P-value is described by J. J. Heithaus in "Measurement and Significance of Asphaltene Peptization", *Journal of Institute of Petroleum*, Vol. 48, Number 458, February 1962, pp. 45-53.

"Pore diameter", "average pore diameter", "median pore diameter", and "pore volume" refer to pore diameter, average pore diameter, median pore diameter, and pore volume, as determined by ASTM Method D4284 (mercury porosimetry at a contact angle equal to 140°). A micromeritics® A9220 instrument (Micromeritics Inc., Norcross, Ga., U.S.A.) may be used to determine these values. Pore volume includes the volume of all pores in the catalyst. Median pore diameter refers to the pore diameter where 50% of the total number of pores have a pore diameter above the median pore diameter and 50% of the total number of pores have a pore diameter below the median pore diameter. Average pore diameter, expressed in Angstrom units (Å), is determined using the following equation:

$$\text{Average pore diameter} = (40{,}000 \times \text{total pore volume in cm}^3/\text{g})/(\text{surface area in m}^2/\text{g}).$$

"Residue" refers to components that have a boiling range distribution above 538° C. (1000° F.), as determined by ASTM Method D5307.

"SCFB" refers to standard cubic feet of gas per barrel of crude feed.

"Surface area" of a catalyst is as determined by ASTM Method D3663.

"TAN" refers to a total acid number expressed as milligrams ("mg") of KOH per gram ("g") of sample. TAN is as determined by ASTM Method D664.

"VGO" refers to hydrocarbons with a boiling range distribution between 343° C. (650° F.) and 538° C. (1000° F.) at 0.101 MPa. VGO content is as determined by ASTM Method D5307.

"Viscosity" refers to kinematic viscosity at 37.8° C. (100° F.). Viscosity is as determined using ASTM Method D445.

In the context of this application, it is to be understood that if the value obtained for a property of the substrate tested is outside of limits of the test method, the test method may be modified and/or recalibrated to test for such property.

Crudes may be produced and/or retorted from hydrocarbon containing formations and then stabilized. Crudes are generally solid, semi-solid, and/or liquid. Crudes may include crude oil. Stabilization may include, but is not limited to, removal of non-condensable gases, water, salts, solids, or combinations thereof from the crude to form a stabilized crude. Such stabilization may often occur at, or proximate to, the production and/or retorting site.

Stabilized crudes include crudes that have not been distilled and/or fractionally distilled in a treatment facility to produce multiple components with specific boiling range distributions (for example, naphtha, distillates, VGO, and/or lubricating oils). Distillation includes, but is not limited to, atmospheric distillation methods and/or vacuum distillation methods. Undistilled and/or unfractionated stabilized crudes may include components that have a carbon number above 4 in quantities of at least 0.5 grams of such components per gram of crude. Stabilized crudes also include crudes from a surface retorting processes. For example, Canadian tar sands may be mined, and then treated in a surface retorting process. The crude produced from such surface retorting may be a stabilized crude. Examples of stabilized crudes include whole crudes, topped crudes, desalted crudes, desalted topped crudes, retorted crudes, or mixtures thereof. "Topped" refers to a crude that has been treated such that at least some of the components that have a boiling point below 35° C. at 0.101 MPa (about 95° F. at 1 atm) have been removed. Typically, topped crudes will have a content of at most 0.1 grams, at most 0.05 grams, or at most 0.02 grams of such components per gram of the topped crude.

Some stabilized crudes have properties that allow the stabilized crudes to be transported to conventional treatment facilities by transportation carriers (for example, pipelines, trucks, or ships). Other crudes have one or more unsuitable properties that render them disadvantaged. Disadvantaged crudes may be unacceptable to a transportation carrier and/or a treatment facility, thus imparting a low economic value to the to disadvantaged crude. The economic value may be such that a reservoir that includes the disadvantaged crude is deemed too costly to produce, transport, and/or treat.

Properties of disadvantaged crudes may include, but are not limited to: a) TAN of at least 0.1, or at least 0.3; b) viscosity of at least 10 cSt; c) API gravity of at most 19; d) a total Ni/V/Fe content of at least 0.00002 grams or at least 0.0001 grams of Ni/V/Fe per gram of disadvantaged crude; e) a total heteroatoms content of at least 0.005 grams of heteroatoms per gram of disadvantaged crude; f) a residue content of at least 0.01 grams of residue per gram of disadvantaged crude; g) a $C_5$ asphaltenes content of at least 0.04 grams of $C_5$ asphaltenes per gram of disadvantaged crude; h) a MCR content of at least 0.0001 grams of MCR per gram of disadvantaged crude; i) a content of metals in metal salts of organic acids of at least 0.00001 grams of metals per gram of disadvantaged crude; or j) combinations thereof. In some embodiments, disadvantaged crudes includes, per gram of disadvantaged crude, at least 0.2 grams of residue, at least 0.3 grams of residue, at least 0.5 grams of residue, or at least 0.9 grams of residue. In some embodiments, disadvantaged crudes have a TAN in a range from about 0.1 to about 20, about 0.3 to about 10, or about 0.4 to about 5. In certain embodiments, disadvantaged crudes, per gram of disadvantaged crude, have a sulfur content of at least 0.005, at least 0.01, or at least 0.02 grams.

In certain embodiments, disadvantaged crudes have, per gram of disadvantaged crude, an MCR content of at least 0.0001 grams, at least 0.001 grams, at least 0.003 grams, at least 0.005 grams, at least 0.01 grams, at least 0.1 grams, or at least 0.5 grams. Disadvantaged crudes may have, per gram of disadvantaged crude, an MCR content in a range from about 0.0001 grams to about 0.5 grams, from about 0.005 grams to about 0.1 grams, or from about 0.01 grams to about 0.05 grams.

In some embodiments, disadvantaged crudes have, per gram of disadvantaged crude, a nitrogen content of at least 0.0001 grams, at least 0.001 grams, at least 0.01 grams, at least 0.05 grams, or at least 0.1 grams. Disadvantaged crudes may have, per gram of disadvantaged crude, a nitrogen content in a range from about 0.0001 grams to about 0.1 grams, from about 0.001 grams to about 0.05 grams, or from about 0.005 grams to about 0.01 grams.

In certain embodiments, disadvantaged crudes have at least 0.00001 grams, at least 0.0001 grams, at least 0.001 grams, or at least 0.01 grams, of alkali and alkaline earth metals in metal salts of organic acids. Disadvantaged crudes may have a content of metals in metal salts of organic acids in a range from about 0.00001 grams to about 0.003 grams, about 0.00005 grams to about 0.005 grams, or about 0.0001 grams to about 0.01 grams of alkali metal and alkaline-earth metal in metal salts of organic acids.

In some embodiments, disadvantaged crudes have properties including, but not limited to: a) TAN of at least 0.5; b) an oxygen content of at least 0.005 grams of oxygen per gram of crude feed; c) a $C_5$ asphaltenes content of at least 0.04 grams of $C_5$ asphaltenes per gram of crude feed; d) a higher than desired viscosity (for example, greater than or equal to 10 cSt for a crude feed with API gravity of at least 10; e) a content of metals in metal salts of organic acids of at least 0.00001 grams of alkali and alkaline earth metals per gram of crude; or 0 combinations thereof.

Disadvantaged crudes may include, per gram of disadvantaged crude: at least 0.001 grams, at least 0.005 grams, or at least 0.01 grams of hydrocarbons with a boiling range distribution between about 95° C. and about 200° C. at 0.101 MPa; at least 0.001 grams, at least 0.005 grams, or at least 0.01 grams of hydrocarbons with a boiling range distribution between about 200° C. and about 300° C. at 0.101 MPa; at least 0.001 grams, at least 0.005 grams, or at least 0.01 grams of hydrocarbons with a boiling range distribution between about 300° C. and about 400° C. at 0.101 MPa; and at least 0.001 grams, at least 0.005 grams, or at least 0.01 grams of hydrocarbons with a boiling range distribution between about 400° C. and 650° C. at 0.101 MPa.

Disadvantaged crudes may include, per gram of disadvantaged crude: at least 0.001 grams, at least 0.005 grams, or at least 0.01 grams of hydrocarbons with a boiling range distribution of at most 100° C. at 0.101 MPa; at least 0.001 grams, at least 0.005 grams, or at least 0.01 grams of hydrocarbons with a boiling range distribution between about 100° C. and about 200° C. at 0.101 MPa; at least 0.001 grams, at least 0.005 grams, or at least 0.01 grams of hydrocarbons with a boiling range distribution between about 200° C. and about 300° C. at 0.101 MPa; at least 0.001 grams, at least 0.005 grams, or at least 0.01 grams of hydrocarbons with a boiling range distribution between about 300° C. and about 400° C. at 0.101 MPa; and at least 0.001 grams, at least 0.005 grams, or at least 0.01 grams of hydrocarbons with a boiling range distribution between about 400° C. and 650° C. at 0.101 MPa.

Some disadvantaged crudes may include, per gram of disadvantaged crude, at least 0.001 grams, at least 0.005 grams, or at least 0.01 grams of hydrocarbons with a boiling range distribution of at most 100° C. at 0.101 MPa, in addition to higher boiling components. Typically, the disadvantaged crude has, per gram of disadvantaged crude, a content of such hydrocarbons of at most 0.2 grams or at most 0.1 grams.

Some disadvantaged crudes may include, per gram of disadvantaged crude, at least 0.001 grams, at least 0.005 grams, or at least 0.01 grams of hydrocarbons with a boiling range distribution below 200° C. at 0.101 MPa.

In certain embodiments, disadvantaged crudes include, per gram of disadvantaged crude, up to 0.9 grams, or up to 0.99 grams of hydrocarbons with a boiling range distribution above 300° C. In certain embodiments, disadvantaged crudes also include, per gram of disadvantaged crude, at least 0.001 grams of hydrocarbons with a boiling range distribution above 650° C. In certain embodiments, disadvantaged crudes include, per gram of disadvantaged crude, up to about 0.9 grams, or up to about 0.99 grams of hydrocarbons with a boiling range distribution between about 300° C. and about 1000° C.

Examples of disadvantaged crudes that might be treated using the processes described herein include, but are not limited to, crudes from of the following regions of the world: U.S. Gulf Coast, southern California, north slope of Alaska, Canada tar sands, Canadian Alberta region, Mexico Bay of Campeche, Argentinean San Jorge basin, Brazilian Santos and Campos basins, Egyptian Gulf of Suez, Chad, United Kingdom North Sea, Angola Offshore, China Bohai Bay, China Karamay, Iraq Zagros, Kazakhstan Caspian, Nigeria Offshore, Madagascar northwest, Oman, Netherlands Schoonebek, Venezuelan Zulia, Malaysia, and Indonesia Sumatra. Treatment of disadvantaged crudes may enhance the properties of the disadvantaged crudes such that the crudes are acceptable for transportation and/or treatment. A crude and/or disadvantaged crude that is to be treated herein is referred to as "crude feed". The crude feed may be topped, as described herein. The crude feed may be obtainable by, but is not limited to, methods as described herein. The crude product resulting from treatment of the crude feed, as described herein, is generally suitable for transporting and/or treatment. Properties of the crude product produced as described herein are closer to the corresponding properties of West Texas Intermediate crude than the crude feed, or closer to the corresponding properties of Brent crude, than the crude feed, thereby enhancing the economic value of the crude feed. Such crude product may be refined with less pre-treatment than other crude products from disadvantaged crude feeds, or no pre-treatment, thereby enhancing refining efficiencies. Pre-treatment may include desulfurization, demetallization and/or atmospheric distillation to remove impurities.

Treatment of a crude feed in accordance with inventions described herein may include contacting the crude feed with the catalyst(s) in a contacting zone and/or combinations of two or more contacting zones. In a contacting zone, at least one property of a crude feed may be changed by contact of the crude feed with one or more catalysts relative to the same property of the crude feed. In some embodiments, contacting is performed in the presence of a hydrogen source. In some embodiments, the hydrogen source is one or more hydrocarbons that under certain contacting conditions react to provide relatively small amounts of hydrogen to compound(s) in the crude feed.

FIG. 1 is a schematic of contacting system 100 that includes an upstream contacting zone 102. The crude feed enters upstream contacting zone 102 via crude feed conduit 104. A contacting zone may be a reactor, a portion of a reactor, multiple portions of a reactor, or combinations thereof. Examples of a contacting zone include a stacked bed reactor, a fixed bed reactor, an ebullating bed reactor, a continuously stirred tank reactor ("CSTR"), a fluidized bed reactor, a spray reactor, and a liquid/liquid contactor. In certain embodiments, the contacting system is on or coupled to an offshore facility. Contact of the crude feed with the catalyst(s) in contacting system 100 may be a continuous process or a batch process.

The contacting zone may include one or more catalysts (for example, two catalysts). In some embodiments, contact of the crude feed with a first catalyst of the two catalysts may reduce metals in metal salts of organic acids of the crude feed. Subsequent contact of the crude feed having reduced metal salts with the second catalyst may decrease MCR content and/or heteroatoms content. In other embodiments, TAN, viscosity, Ni/V/Fe content, heteroatoms content, residue content, API gravity, or combinations of these properties of the crude product change by at least 10% relative to the same properties of the crude feed after contact of the crude feed with one or more catalysts.

In certain embodiments, a volume of catalyst in the contacting zone is in a range from about 10% to about 60 vol %, about 20% to about 50 vol %, or about 30% to about 40 vol % of a total volume of crude feed in the contacting zone. In some embodiments, a slurry of catalyst and crude feed may include from about 0.001 grams to about 10 grams, about 0.005 grams to about 5 grams, or about 0.01 grams to about 3 grams of catalyst per 100 grams of crude feed in the contacting zone.

Contacting conditions in the contacting zone may include, but are not limited to, temperature, pressure, hydrogen source flow, crude feed flow, or combinations thereof. Contacting conditions in some embodiments are controlled to produce a crude product with specific properties. Temperature in the contacting zone may range from about 50° C. to about 500° C., about 60° C. to about 440° C., about 70° C. to about 430° C., or about 80° C. to about 420° C. Pressure in a contacting zone may range from about 0.1 MPa to about 20 MPa, about 1 MPa to about 12 MPa, about 4 MPa to about 10 MPa, or about 6 MPa to about 8 MPa. LHSV of the crude feed will generally range from about 0.05 $h^{-1}$ to about 30 $h^{-1}$, about 0.5 $h^{-1}$ to about 25 $h^{-1}$, about 1 $h^{-1}$ to about 20 $h^{-1}$, about 1.5 $h^{-1}$ to about 15 $h^{-1}$, or about 2 $h^{-1}$ to about $10^{-1}$. In some embodiments, LHSV is at least 5 $h^{-1}$, at least 11 $h^{-1}$, at least 15 $h^{-1}$, or at least 20 $h^{-1}$. In some embodiments, the total pressure is at most 18 MPa, at most 16 MPa, at most 14 MPa, at most 12 MPa, at most 10 MPa, or at most 8 MPa. In certain embodiments, the temperature is at most 430° C., at most 420° C., at most 410° C., or at most 400° C.

In embodiments in which the hydrogen source is supplied as a gas (for example, hydrogen gas), a ratio of the gaseous hydrogen source to the crude feed typically ranges from about 0.1 $Nm^3/m^3$ to about 100,000 $Nm^3/m^3$, about 0.5 $Nm^3/m^3$ to about 10,000 $Nm^3/m^3$, about 1 $Nm^3/m^3$ to about 8,000 $Nm^3/m^3$, about 2 $Nm^3/m^3$ to about 5,000 $Nm^3/m^3$, about 5 $Nm^3/m^3$ to about 3,000 $Nm^3/m^3$, or about 10 $Nm^3/m^3$ to about 800 $Nm^3/m^3$ contacted with the catalyst(s). The hydrogen source, in some embodiments, is combined with carrier gas(es) and recirculated through the contacting zone. Carrier gas may be, for example, nitrogen, helium, and/or argon. The carrier gas may facilitate flow of the crude feed and/or flow of the hydrogen source in the contacting zone(s). The carrier gas may also enhance mixing in the contacting zone(s). In some embodiments, a hydrogen source (for example, hydrogen, methane or ethane) may be used as a carrier gas and recirculated through the contacting zone.

The hydrogen source may enter upstream contacting zone 102 co-currently with the crude feed in crude feed conduit 104 or separately via gas conduit 106. In upstream contacting zone 102, contact of the crude feed with a catalyst produces a total product that includes a crude product, and, in some embodiments, gas. In some embodiments, a carrier gas is combined with the crude feed and/or the hydrogen source in conduit 106. The total product may exit upstream contacting zone 102 and enter downstream separation zone 108 via total product conduit 110.

In downstream separation zone 108, the crude product and gas may be separated from the total product using generally known separation techniques, for example, gas-liquid separation. The crude product may exit downstream separation zone 108 via crude product conduit 112, and then be transported to transportation carriers, pipelines, storage vessels, refineries, other processing zones, or a combination thereof. The gas may include gas formed during processing (for example, hydrogen sulfide, carbon dioxide, and/or carbon monoxide), excess gaseous hydrogen source, and/or carrier gas. The excess gas may be recycled to contacting system 100, purified, transported to other processing zones, storage vessels, or combinations thereof.

In some embodiments, contacting the crude feed with the catalyst(s) to produce a total product is performed in two or more contacting zones. The total product may be separated to form the crude product and gas(es).

Figure 2A:
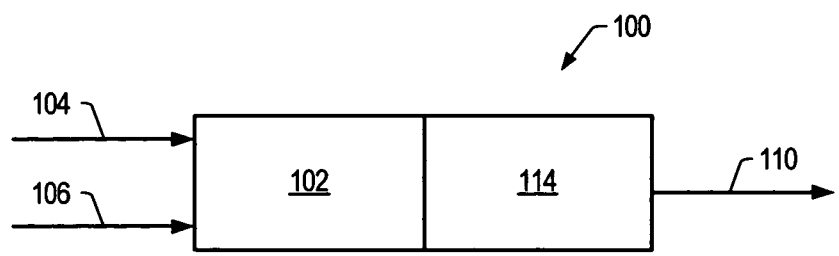
FIGS. 2A and 2B are schematics of embodiments of contacting systems that include two contacting zones.
Figure 2B:
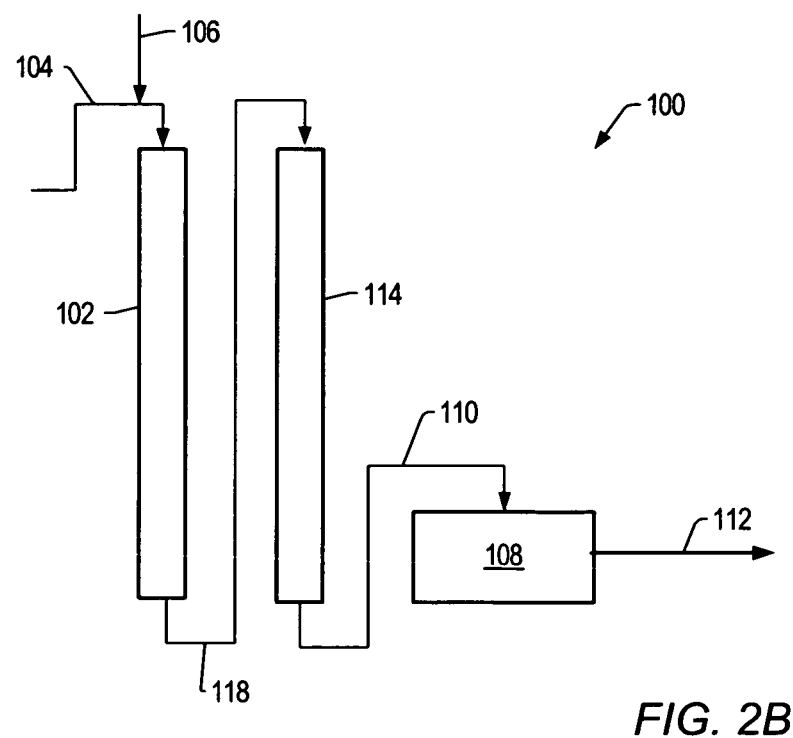
Figure 3A:
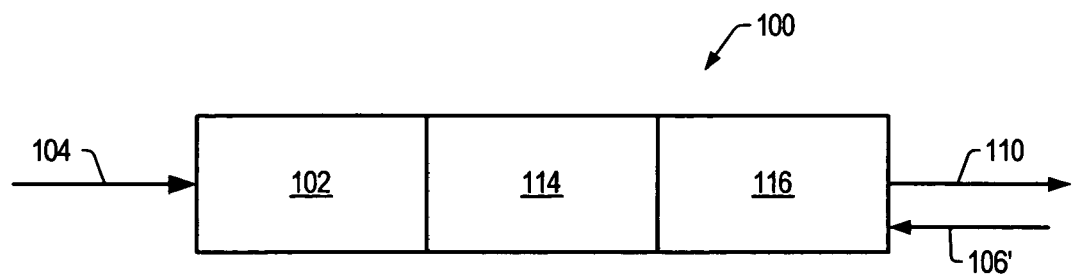
FIGS. 3A and 3B are schematics of embodiments of contacting systems that include three contacting zones.
Figure 3B:
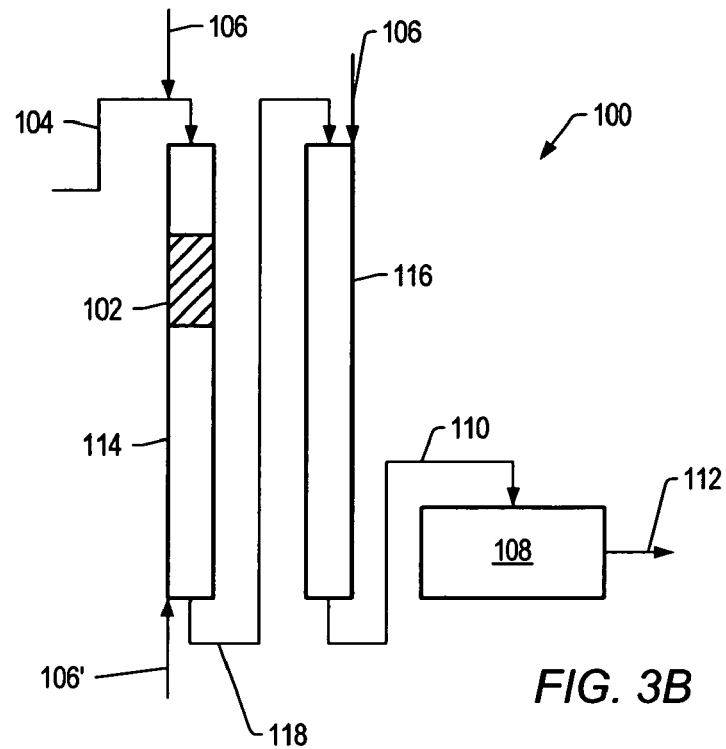

FIGS. 2-3 are schematics of embodiments of contacting system 100 that includes two or three contacting zones. In FIGS. 2A and 2B, contacting system 100 includes upstream contacting zone 102 and downstream contacting zone 114. FIGS. 3A and 3B include contacting zones 102, 114, 116. In FIGS. 2A and 3A, contacting zones 102, 114, 116 are depicted as separate contacting zones in one reactor. The crude feed enters upstream contacting zone 102 via crude feed conduit 104.

In some embodiments, the carrier gas is combined with the hydrogen source in gas conduit 106 and is introduced into the contacting zones as a mixture. In certain embodiments, as shown in FIGS. 1, 3A, and 3B, the hydrogen source and/or the carrier gas may enter the one or more contacting zones with the crude feed separately via gas conduit 106 and/or in a direction counter to the flow of the crude feed via, for example, gas conduit 106'. Addition of the hydrogen source and/or the carrier gas counter to the flow of the crude feed may enhance mixing and/or contact of the crude feed with the catalyst.

Contact of the crude feed with catalyst(s) in upstream contacting zone 102 forms a feed stream. The feed stream flows from upstream contacting zone 102 to downstream contacting zone 114. In FIGS. 3A and 3B, the feed stream flows from downstream contacting zone 114 to additional downstream contacting zone 116.

Contacting zones 102, 114, 116 may include one or more catalysts. As shown in FIG. 2B, the feed stream exits upstream contacting zone 102 via feed stream conduit 118 and enters downstream contacting zone 114. As shown in FIG. 3B, the feed stream exits to downstream contacting zone 114 via conduit 118 and enters additional downstream contacting zone 116.

The feed stream may be contacted with additional catalyst(s) in downstream contacting zone 114 and/or additional downstream contacting zone 116 to form the total product. The total product exits downstream contacting zone 114 and/or additional downstream contacting zone 116 and enters downstream separation zone 108 via total product conduit 110. The crude product and/or gas is (are) separated from the total product. The crude product exits downstream separation zone 108 via crude product conduit 112.

Figure 4:
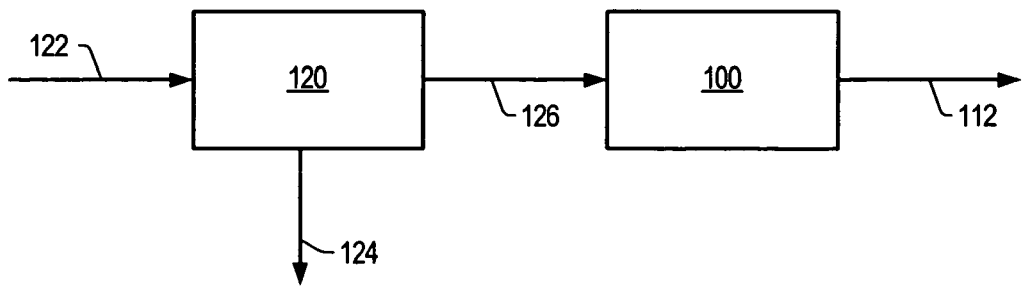
FIG. 4 is a schematic of an embodiment of a separation zone in combination with a contacting system.

FIG. 4 is a schematic of an embodiment of a separation zone upstream of contacting system 100. The disadvantaged crude (either topped or untopped) enters upstream separation zone 120 via crude conduit 122. In upstream separation zone 120, at least a portion of the disadvantaged crude is separated using techniques known in the art (for example, sparging, membrane separation, pressure reduction, filtering, or combinations thereof) to produce the crude feed. For example, water may be at least partially separated from the disadvantaged crude in upstream separation zone 120. In another example, components that have a boiling range distribution below 95° C. or below 100° C. may be at least partially separated from the disadvantaged crude in upstream separation zone 120 to produce the crude feed. In some embodiments, at least a portion of naphtha and compounds more volatile than naphtha are separated from the disadvantaged crude. In some embodiments, at least a portion of the separated components exit upstream separation zone 120 via conduit 124.

The crude feed obtained from upstream separation zone 120, in some embodiments, includes a mixture of components with a boiling range distribution of at least 100° C. or, in some embodiments, a boiling range distribution of at least 120° C. Typically, the separated crude feed includes a mixture of components with a boiling range distribution between about 100° C. to about 1000° C., about 120° C. to about 900° C., or about 200° C. to about 800° C. At least a portion of the crude feed exits upstream separation zone 120 and enters contacting system 100 (see, for example, the contacting zones in FIGS. 1-3) via additional crude feed conduit 126 to be further processed to form a crude product. In some embodiments, upstream separation zone 120 may be positioned upstream or downstream of a desalting unit. In certain embodiments, upstream separation zone 120 may be positioned downstream of a retorting process for bitumen, oil shale, and/or tar sands. After to processing, the crude product exits contacting system 100 via crude product conduit 112.

In some embodiments, the crude product is blended with a crude that is the same as or different from the crude feed. For example, the crude product may be combined with a crude having a different viscosity thereby resulting in a blended product having a viscosity that is between the viscosity of the crude product and the viscosity of the crude. In another example, the crude product may be blended with crude having a TAN and/or MCR content that is different, thereby producing a product that has a TAN and/or MCR content that is between the TAN and/or MCR content of the crude product and the crude. The blended product may be suitable for transportation and/or treatment.

As shown in FIG. 5, in certain embodiments, crude feed enters contacting system 100 via crude feed conduit 104, and at least a portion of the crude product exits contacting system 100 via conduit 128 and is introduced into blending zone 130. In blending zone 130, at least a portion of the crude product is combined with one or more process streams (for example, a hydrocarbon stream such as naphtha produced from separation of one or more crude feeds), a crude, a crude feed, or mixtures thereof, to produce a blended product. The process streams, crude feed, crude, or mixtures thereof are introduced directly into blending zone 130 or upstream of such blending zone via stream conduit 132. A mixing system may be located in or near blending zone 130. The blended product may meet product specifications designated by refineries and/or transportation carriers. Product specifications include, but are not limited to, a range of or a limit of API gravity, TAN, viscosity, or combinations thereof. The blended product exits blending zone 130 via blend conduit 134 to be transported or processed.

In FIG. 6, the disadvantaged crude enters upstream separation zone 120 through crude conduit 122, and the disadvantaged crude is separated as previously described to form the crude feed. The crude feed then enters contacting system 100 through additional crude feed conduit 126. At least some components from the disadvantaged crude exit separation zone 120 via conduit 124. At least a portion of the crude product exits contacting system 100 and enters blending zone 130 through crude product conduit 128. Other process streams and/or crudes enter blending zone 130 directly or via stream conduit 132 and are combined with the crude product to form a blended product. The blended product exits blending zone 130 via blend conduit 134.

In some embodiments, the crude product and/or the blended product are transported to a refinery and distilled and/or fractionally distilled to produce one or more distillate fractions. The distillate fractions may be processed to produce commercial products such as transportation fuel, lubricants, or chemicals.

In some embodiments, after contact of the crude feed with the catalyst, the crude product has a TAN of at most 90%, at most 50%, at most 30%, or at most 10% of the TAN of the crude feed. In certain embodiments, the crude product has a TAN of at most 1, at most 0.5, at most 0.3, at most 0.2, at most 0.1, or at most 0.05. TAN of the crude product will frequently be at least 0.0001 and, more frequently, at least 0.001. In some embodiments, TAN of the crude product may be in a range from about 0.001 to about 0.5, about 0.01 to about 0.2, or about 0.05 to about 0.1.

In some embodiments, the crude product has a total Ni/V/Fe content of at most 90%, at most 50%, at most 30%, at most 10%, at most 5%, or at most 3% of the Ni/V/Fe content of the crude feed. In certain embodiments, the crude product has, per gram of crude product a total Ni/V/Fe content in a range from about $1 \times 10^{-7}$ grams to about $5 \times 10^{-5}$ grams, about $3 \times 10^{-7}$ grams to about $2 \times 10^{-5}$ grams, or about $1 \times 10^{-6}$ grams to about $1 \times 10^{-5}$ grams. In certain embodiments, the crude product has at most $2 \times 10^{-5}$ grams of Ni/V/Fe per gram of crude product. In some embodiments, a total Ni/V/Fe content of the crude product is about 70% to about 130%, about 80% to about 120%, or about 90% to about 110% of the Ni/V/Fe content of the crude feed.

In some embodiments, the crude product has a total content of metals in metal salts of organic acids of at most 90%, at most 50%, at most 30%, at most 10%, or at most 5% of the total content of metals in metal salts of organic acids in the crude feed. In some embodiments, the total content of metals in metal salts of organic acids is in a range from about 0.1% to about 75%, from about 0.5% to about 45%, from about 1% to about 25%, or from about 2% to about 9% of the content of metals in metal salts of organic acids of the crude feed. Organic acids that generally form metal salts include, but are not limited to, carboxylic acids, thiols, imides, sulfonic acids, and sulfonates. Examples of carboxylic acids include, but are not limited to, naphthenic acids, phenanthrenic acids, and benzoic acid. The metal portion of the metal salts may include alkali metals (for example, lithium, sodium, and potassium), alkaline-earth metals (for example, magnesium, calcium, and barium), Column 12 metals (for example, zinc and cadmium), Column 15 metals (for example arsenic), Column 6 metals (for example, chromium), or mixtures thereof.

In some embodiments, the crude product has a total content of alkali metal and alkaline-earth metal in metal salts of organic acids of at most 90%, at most 80%, at most 50%, at most 30%, at most 10%, or at most 5% of the content of alkali metal and alkaline-earth metal in metal salts of organic acids in the crude feed. In some embodiments, the total content of alkali metal and alkaline-earth metal in metal salts of organic acids in the crude product is in a range from about 0.1% to about 75%, from about 0.5% to about 45%, from about 1% to about 25%, or from about 2% to about 9% of the total content of alkali metal and alkaline-earth metal salts of organic acids in the crude feed.

In certain embodiments, the crude product has a total content of zinc salts of one or more organic acids of at most 90%, at most 80%, at most 50%, at most 30%, at most 10%, or at most 5% of the content of zinc salts of one or more organic acids in the crude feed. In some embodiments, the total content of zinc salts of organic acids in the crude product is in a range from about 0.1% to about 75%, from about 0.5% to about 45%, from about 1% to about 25%, or from about 2% to about 9% of the total content of zinc salts of organic acids in the crude feed.

In some embodiments, the crude product has a total content of chromium and/or arsenic in metal salts of organic acids of at most 90% of the content of chromium and/or arsenic in metal salts of organic acids in the crude feed.

In certain embodiments, the crude product has, per gram of crude product, from about $1 \times 10^{-7}$ grams to about $5 \times 10^{-5}$ grams, about $5 \times 10^{-7}$ grams to about $1 \times 10^{-5}$ grams, or about $1 \times 10^{-6}$ grams to about $5 \times 10^{-6}$ grams of alkali metal and alkaline-earth metal in metal salts of organic acids.

In certain embodiments, API gravity of the crude product produced from contact of the crude feed with catalyst, at the contacting conditions, is about 70% to about 130%, about 80% to about 120%, about 90% to about 110%, or about 100% to about 130% of the API gravity of the crude feed. In certain embodiments, API gravity of the crude product is from about 14 to about 40, about 15 to about 30, or about 16 to about 25.

In certain embodiments, the crude product has a viscosity of at most 90%, at most 80%, at most 70%, at most 50%, at most 30%, at most 10%, or at most 5% of the viscosity of the crude feed. In some embodiments, the viscosity of the crude product is at most 90% of the viscosity of the crude feed while the API gravity of the crude product is about 70% to about 130%, about 80% to about 120%, or about 90% to about 110% of the API gravity the crude feed.

In some embodiments, the crude product has a total heteroatoms content of at most 90%, at most 50%, at most 30%, at most 10%, or at most 5% of the total heteroatoms content of the crude feed. In certain embodiments, the crude product has a total heteroatoms content of at least 1%, at least 30%, at least 80%, or at least 99% of the total heteroatoms content of the crude feed.

In some embodiments, the sulfur content of the crude product may be at most 90%, at most 50%, at most 30%, at most 10%, or at most 5% of the sulfur content of the crude feed. In certain embodiments, the crude product has a sulfur content of at least 1%, at least 30%, at least 80%, or at least 99% of the sulfur content of the crude feed.

In some embodiments, total nitrogen content of the crude product may be at most 90%, at most 80%, at most 70%, at most 50%, at most 30% or at most 10%, or at most 5% of a total nitrogen content of the crude feed. In certain embodiments, the crude product has a total nitrogen content of at least 1%, at least 30%, at least 80%, or at least 99% of the total nitrogen content of the crude feed. In certain embodiments, the crude product has a total nitrogen content in a range from about 0.1% to about 75%, from about 0.5% to about 45%, from about 1% to about 25%, or about 2% to about 9% of the total nitrogen content of the crude feed. In some embodiments, the crude product has, per gram of crude product, a total nitrogen content in a range from about 0.00001 grams to about 0.05 grams, about 0.0001 grams to about 0.01 grams, or about 0.0005 grams to about 0.001 grams.

In certain embodiments, basic nitrogen content of the crude product may be at most 95%, at most 90%, at most 50%, at most 30%, at most 10%, or at most 5% of the basic nitrogen content of the crude feed. In certain embodiments, the crude product has a basic nitrogen content of at least 1%, at least 30%, at least 80%, or at least 99% of the basic nitrogen content of the crude feed.

In some embodiments, the oxygen content of the crude product may be at most 90%, at most 50%, at most 30%, at most 10%, or at most 5% of the oxygen content of the crude feed. In certain embodiments, the oxygen content of crude product may be least 1%, at least 30%, at least 80%, or at least 99% of the oxygen content of the crude feed. In some embodiments, the total content of carboxylic acid compounds of the crude product may be at most 90%, at most 50%, at most 30%, at most 10%, or at most 5% of the content of the carboxylic acid compounds in the crude feed. In certain embodiments, the total content of carboxylic acid compounds of the crude product may be at least 1%, at least 30%, at least 80%, or at least 99% of the total content of carboxylic acid compounds in the crude feed.

In some embodiments, selected organic oxygen compounds may be reduced in the crude feed. In some embodiments, carboxylic acids and/or metal salts of carboxylic acids may be chemically reduced before non-carboxylic containing organic oxygen compounds. Carboxylic acids and non-carboxylic containing organic oxygen compounds in a crude product may be differentiated through analysis of the crude product using generally known spectroscopic methods (for example, infrared analysis, mass spectrometry, and/or gas chromatography).

The crude product, in certain embodiments, has an oxygen content of at most 90%, at most 80%, at most 70%, or at most 50% of the oxygen content of the crude feed, and TAN of the crude product is at most 90%, at most 70%, at most 50%, at most 30% or at most 40% of the TAN of the crude feed. In certain embodiments, the oxygen content of the crude product may be at least 1%, at least 30%, at least 80%, or at least 99% of the oxygen content of the crude feed, and the crude product has a TAN of at least 1%, at least 30%, at least 80%, or at least 99% of the TAN of the crude feed.

Additionally, the crude product may have a content of carboxylic acids and/or metal salts of carboxylic acids of at most 90%, at most 70%, at most 50%, or at most 40% of the crude feed, and a content of non-carboxylic acid containing organic oxygen compounds within about 70% to about 130%, about 80% to about 120%, or about 90% to about 110% of the non-carboxylic acid containing organic oxygen compounds of the crude feed.

In some embodiments, the crude product includes, in its molecular structure, from about 0.05 grams to about 0.15 grams or from about 0.09 grams to about 0.13 grams of hydrogen per gram of crude product. The crude product may include, in its molecular structure, from about 0.8 grams to about 0.9 grams or from about 0.82 grams to about 0.88 grams of carbon per gram of crude product. A ratio of atomic hydrogen to atomic carbon (H/C) of the crude product may be within about 70% to about 130%, about 80% to about 120%, or about 90% to about 110% of the atomic H/C ratio of the crude feed. A crude product atomic H/C ratio within about 10% to about 30% of the crude feed atomic H/C ratio indicates that uptake and/or consumption of hydrogen in the process is relatively small, and/or that hydrogen is produced in situ.

The crude product includes components with a range of boiling points. In some embodiments, the crude product includes, per gram of the crude product: at least 0.001 grams, or from about 0.001 grams to about 0.5 grams of hydrocarbons with a boiling range distribution of at most 100° C. at 0.101 MPa; at least 0.001 grams, or from about 0.001 grams to about 0.5 grams of hydrocarbons with a boiling range distribution between about 100° C. and about 200° C. at 0.101 MPa; at least 0.001 grams, or from about 0.001 grams to about 0.5 grams of hydrocarbons with a boiling range distribution between about 200° C. and about 300° C. at 0.101 MPa; at least 0.001 grams, or from about 0.001 grams to about 0.5 grams of hydrocarbons with a boiling range distribution between about 300° C. and about 400° C. at 0.101 MPa; and at least 0.001 grams, or from about 0.001 grams to about 0.5 grams of hydrocarbons with a boiling range distribution between about 400° C. and about 538° C. at 0.101 MPa.

In some embodiments the crude product includes, per gram of crude product, at least 0.001 grams of hydrocarbons with a boiling range distribution of at most 100° C. at 0.101 MPa and/or at least 0.001 grams of hydrocarbons with a boiling range distribution between about 100° C. and about 200° C. at 0.101 MPa.

In some embodiments, the crude product may have at least 0.001 grams, or at least 0.01 grams of naphtha per gram of crude product. In other embodiments, the crude product may have a naphtha content of at most 0.6 grams, or at most 0.8 grams of naphtha per gram of crude product.

In some embodiments, the crude product has, per gram of crude product, a distillate content in a range from about 0.00001 grams to about 0.5 grams, about 0.001 grams to about 0.3 grams, or about 0.002 grams to about 0.2 grams.

In certain embodiments, the crude product has, per gram of crude product, a VGO content in a range from about 0.00001 grams to about 0.8 grams, about 0.001 grams to about 0.5 grams, about 0.005 grams to about 0.4 grams, or about 0.01 grams to about 0.3 grams.

In some embodiments, the crude product has a residue content of at most 90%, at most 70%, at most 50%, at most 30%, or at most 10% of the residue content of the crude feed. In certain embodiments, the crude product has a residue content of about 70% to about 130%, about 80% to about 120%, or about 90% to about 110% of the residue content of the crude feed. The crude product may have, per gram of crude product, a residue content in a range from about 0.00001 grams to about 0.8 grams, about 0.0001 grams to about 0.5 grams, about 0.0005 grams to about 0.4 grams, about 0.001 grams to about 0.3 grams, about 0.005 grams to about 0.2 grams, or about 0.01 grams to about 0.1 grams.

In some embodiments, the $C_5$ asphaltenes content is at most 90%, at most 80%, at most 70%, at most 50%, at most 30%, or at most 10% of the $C_5$ asphaltenes content of the crude feed. In certain embodiments, the $C_5$ asphaltenes content of the crude product is at least 10%, at least 60%, or at least 70% of the $C_5$ asphaltenes content of the crude feed. The crude product may have a $C_5$ asphaltenes content in a range from about 0.1% to about 75%, from about 0.5% to about 45%, from about 1% to about 25%, or from about 2% to about 9% of the $C_5$ asphaltenes content of the crude feed. The crude product has, in some embodiments, from about 0.0001 grams to about 0.1 grams, from about 0.005 grams to about 0.08 grams, or from about 0.01 grams to about 0.05 grams of $C_5$ asphaltenes per gram of crude product.

In certain embodiments, the crude product has an MCR content that is at most 90%, at most 80%, at most 50%, at most 30%, or at most 10% of the MCR content of the crude feed. In some embodiments, the crude product has a MCR content in a range from about 0.1% to about 75%, from about 0.5% to about 45%, from about 1% to about 25%, or from about 2% to about 9% of the MCR content of the crude feed. The crude product has, in some embodiments, from about 0.00001 grams to about 0.1 grams, about 0.0001 grams to about 0.05 grams, or about 0.001 grams to about 0.005 grams of MCR per gram of crude product.

In some embodiments, the $C_5$ asphaltenes content and MCR content may be combined to produce a mathematical relationship between the high viscosity components in the crude product relative to the high viscosity components in the crude feed. For example, a sum of a crude feed $C_5$ asphaltenes content and a crude feed MCR content may be represented by S. A sum of a crude product $C_5$ asphaltenes content and a crude product MCR content may be represented by S'. The sums may be compared (S' to S) to assess the net reduction in high viscosity components in the crude feed. S' of the crude product may be in a range from about 1% to about 99%, about 10% to about 90%, or about 20% to about 80% of S. In some embodiments, a ratio of MCR content of the crude product to $C_5$ asphaltenes content is in a range from about 1.0 to about 3.0, about 1.2 to about 2.0, or about 1.3 to about 1.9.

In some embodiments, the crude product includes from greater than 0 grams, but less than 0.01 grams, from about 0.000001 grams to about 0.001 grams, or from about 0.00001 grams to about 0.0001 grams of total catalyst per gram of crude product. The catalyst may assist in stabilizing the crude product during transportation and/or treatment. The catalyst may inhibit corrosion, inhibit friction, and/or increase water separation to abilities of the crude product. Methods described herein may be configured to add one or more catalysts described herein to the crude product during treatment.

The crude product produced from contacting system 100 (as shown in FIGS. 1-6) has properties different than properties of the crude feed. Such properties may include, but are not limited to: a) reduced TAN; b) reduced viscosity; c) reduced total Ni/V/Fe content; d) reduced content of sulfur, oxygen, nitrogen, or combinations thereof; e) reduced residue content; f) reduced $C_5$ asphaltenes content; g) reduced MCR content; h) increased API gravity; i) a reduced content of metals in metal salts of organic acids; j) increased stability relative to the crude feed; or k) combinations thereof.

Catalysts used in one or more embodiments of the inventions may include one or more bulk metals and/or one or more metals on a support. The metals may be in elemental form or in the form of a compound of the metal. The catalysts described herein may be introduced into the contacting zone as a precursor, and then become active as a catalyst in the contacting zone (for example, when sulfur and/or a crude feed containing sulfur is contacted with the precursor). The catalyst or combination of catalysts used as described herein may or may not be commercial catalysts. Examples of commercial catalysts that are contemplated to be used as described herein include HDS22; HDN60; C234; C311; C344; C411; C424; C344; C444; C447; C454; C448; C524; C534; DN120; DN140; DN190; DN200; DN800; DC2118; DC2318; DN3100; DN3110; DN3300; DN3310; RC400; RC410; RN412; RN400; RN410; RN420; RN440; RN450; RN650; RN5210; RN5610; RN5650; RM430; RM5030; Z603; Z623; Z673; Z703; Z713; Z723; Z753; and Z763, which are available from CRI International, Inc. (Houston, Tex., U.S.A.).

In some embodiments, catalysts used to change properties of the crude feed include one or more Columns 5-10 metal(s) on a support. Columns 5-10 metal(s) include, but are not limited to, vanadium, chromium, molybdenum, tungsten, manganese, technetium, rhenium, iron, cobalt, nickel, ruthenium, palladium, rhodium, osmium, iridium, platinum, or mixtures thereof. Compounds of Columns 5-10 metal(s) include, but are not limited to, oxides, nitrates, ammonium salts, and carbonates of the Columns 5-10 metal(s). Examples of Columns 5-10 metal compounds include, but are not limited to, molybdenum trioxide, molybdenum ammonium oxide, molybdenum carbonate, tungsten trioxide, nickel oxide, nickel carbonate, nickel nitrate, cobalt carbonate, and cobalt oxide.

The catalyst may have, per gram of catalyst, a total Columns 5-10 metal(s) content in a range from at least 0.0001 grams, at least 0.001 grams, at least 0.01 grams, at least 0.3 to grams, at least 0.5 grams, at least 0.6 grams, at least 0.8 grams, or at least 0.9 grams. A total content of Columns 5-10 metal(s), per gram of catalyst, may be in a range about 0.0001 grams to about 0.99 grams, about 0.0005 grams to about 0.5 grams, about 0.001 grams to about 0.3 grams, about 0.005 grams to about 0.2 grams, or about 0.01 grams to about 0.1 grams. In some embodiments, the catalyst includes Column 15 element(s) in addition to the Columns 5-10 metal(s). An example of a Column 15 element is phosphorus. The catalyst may have a total Column 15 element content, per gram of catalyst, in range from about 0.000001 grams to about 0.1 grams, about 0.00001 grams to about 0.06 grams, about 0.00005 grams to about 0.03 grams, or about 0.0001 grams to about 0.001 grams. In other embodiments, the catalyst does not include a Column 15 element.

In some embodiments, the catalyst includes a combination of Column 6 metal(s) with one or more metals from Column 5 and/or Columns 7-10. A molar ratio of Column 6 metal to Column 5 metal may be in a range from about 0.1 to about 20, about 1 to about 10, or about 2 to about 5. A molar ratio of Column 6 metal to Columns 7-10 metal may be in a range from about 0.1 to about 20, about 1 to about 10, or about 2 to about 5. In some embodiments, the catalyst includes Column 15 element(s) in addition to the combination of Column 6 metal(s) with one or more metals from Columns 5 and/or 7-10. In other embodiments, the catalyst includes Column 6 metal(s) and Column 10 metal(s). A molar ratio of the total Column 10 metal to the total Column 6 metal in the catalyst may be in a range from about 1 to about 10, or from about 2 to about 5. In certain embodiments, the catalyst includes Column 5 metal(s) and Column 10 metal(s). A molar ratio of the total Column 10 metal to the total Column 5 metal in the catalyst may be in a range from about 1 to about 10, or from about 2 to about 5.

In certain embodiments, the catalyst includes Column 6 metal(s). The catalyst may have, per gram of catalyst, a total Column 6 metal(s) content of at least 0.00001 grams, at least 0.01 grams, at least 0.02 grams and/or in a range from about 0.0001 grams to about 0.6 grams, about 0.001 grams to about 0.3 grams, about 0.005 grams to about 0.2 grams, or about 0.01 grams to about 0.1 grams. In some embodiments, the catalyst includes from about 0.0001 grams to about 0.2 grams, from about 0.001 grams to about 0.08 grams, or from about 0.01 grams to 0.06 grams of Column 6 metal(s) per gram of catalyst. In some embodiments, the catalyst includes Column 15 element(s) in addition to the Column 6 metal(s).

In some embodiments, the catalyst includes a combination of Column 6 metal(s) with one or more metals from Columns 7-10. The catalyst may have, per gram of catalyst, a total Column 7-10 metal(s) content in a range from about 0.0001 grams to about 0.1 grams, from about 0.001 grams to about 0.05 grams, or from about 0.01 grams to about 0.03 grams. In certain embodiments, the catalyst includes, per gram of catalyst, from about 0.01 grams to about 0.15 grams of molybdenum and from about 0.001 grams to about 0.05 grams of nickel. The catalyst, in some embodiments, also includes from about 0.001 grams to about 0.05 grams of iron per gram of catalyst.

In some embodiments, the catalyst includes, per gram of catalyst, from about 0.01 grams to about 0.15 grams of molybdenum, from about 0.001 grams to about 0.05 grams of nickel, from about 0.001 grams to about 0.05 grams of iron, and from about 0.0001 grams to about 0.05 grams of phosphorus.

In some embodiments, Columns 5-10 metal(s) are incorporated in, or deposited on, a support to form the catalyst. In certain embodiments, Columns 5-10 metal(s) in combination with Column 15 element(s) are incorporated in, or deposited on, the support to form the catalyst. In embodiments in which the metal(s) and/or element(s) are supported, the weight of the catalyst includes all support, all metal(s), and all element(s). The support may be porous and may include refractory oxides, porous carbon based materials, zeolites, or combinations thereof. Refractory oxides may include, but are not limited to, alumina, silica, silica-alumina, titanium oxide, zirconium oxide, magnesium oxide, or mixtures thereof. Supports may be obtained from a commercial manufacturer such as Criterion Catalysts and Technologies LP (Houston, Tex., U.S.A.). Porous carbon based materials include, but are not limited to, activated carbon and/or porous graphite. Examples of zeolites include Y-zeolites, beta zeolites, mordenite zeolites, ZSM-5 zeolites, and ferrierite zeolites. Zeolites may be obtained from a commercial manufacturer such as Zeolyst (Valley Forge, Pa., U.S.A.). The support may be prepared and/or selected based upon a variety of desired characteristics. Examples of characteristics include, but are not limited to, pore volume, average pore diameter, pore volume distribution, surface area, and percentage of pores above or in a certain pore diameter range.

The support, in some embodiments, is prepared such that the support has an average pore diameter of at least 90 Å, at least 110 Å, at least 130 Å, at least 150 Å, at least 170 Å, or at least 180 Å. In certain embodiments, the support is prepared by combining water with the support to form a paste. In some embodiments, an acid is added to the paste to assist in extrusion of the paste. The water and dilute acid are added in such amounts and by such methods as required to give the extrudable paste a desired consistency. Examples of acids include, but are not limited to, nitric acid, acetic acid, sulfuric acid, and hydrochloric acid.

The paste may be extruded and cut using generally known catalyst extrusion methods and catalyst cutting methods to form extrudates. The extrudates may be heat-treated at a temperature in a range from about 65° C. to about 260° C. or from about 85° C. to about 235° C. for a period of time (for example, for about 0.5 hours to about 8 hours) and/or until the moisture content of the extrudate has reached a desired level. The heat-treated extrudate may be further heat-treated at a temperature in a range from about 800° C. to about 1200° C. or about 900° C. to about 1100° C. to form a support having an average pore diameter of at least 150 Å. The supports have a pore volume distribution over a range of pore diameters. In some embodiments, the support contains pores that have a pore diameter of at least 350 Å, at least 400 Å, at least 500 Å, or at least 1000 Å, or in a range of about 350 Å to about 5000 Å, about 400 Å to about 1000 Å, or about 500 Å to about 900 Å, which provide at most 15%, at most 10%, at most 5% at most 3%, at most 1% or at most 0.5% of the total pore volume of the support.

In certain embodiments, the support includes gamma alumina, theta alumina, delta alumina, alpha alumina, or combinations thereof. The amount of gamma alumina, delta alumina, alpha alumina, or combinations thereof, per gram of catalyst support, may be in a range from about 0.0001 grams to about 0.99 grams, about 0.001 grams to about 0.5 grams, about 0.01 grams to about 0.1 grams, or at most 0.1 grams as determined by x-ray diffraction. In some embodiments, the support includes, per gram of support, at least 0.5 grams, at least 0.8 grams, at least 0.9 grams, or at least 0.95 grams of gamma alumina. In certain embodiments, the support contains, per gram of support, from about 0.5 grams to about 0.99 grams, from about 0.6 grams to about 0.9 grams, or from about 0.7 grams to about 0.8 grams of gamma alumina. In certain embodiments, the support has, either alone or in combination with other forms of alumina, a theta alumina content, per gram of support, in a range from about 0.1 grams to about 0.99 grams, about 0.5 grams to about 0.9 grams, or about 0.6 grams to about 0.8 grams, as determined by x-ray diffraction. In some embodiments, the support may have, per gram of support, at least 0.1 grams, at least 0.3 grams, at least 0.5 grams, or at least 0.8 grams of theta alumina, as determined by x-ray diffraction.

In certain embodiments, the support includes, per gram of support, at most 0.2 grams, at most 0.1 grams, at most 0.08 grams, at most 0.06 grams, at most 0.05 grams, at most 0.04 grams, at most 0.03 grams, at most 0.02 grams, or at most 0.01 grams of silica. In certain embodiments, the support has, per gram of support, from about 0.001 grams to about 0.2 grams or from about 0.01 grams to about 0.1 grams of silica. In some embodiments, the support includes a combination of silica and alumina.

Supported catalysts may be prepared using generally known catalyst preparation techniques. Examples of catalyst preparations are described in U.S. Pat. Nos. 6,218,333 to Gabrielov et al.; 6,290,841 to Gabrielov et al.; and 5,744,025 to Boon et al., and U.S. Patent Application Publication No. US 2003/0111391 to Bhan.

In some embodiments, the support may be combined with metal to form a catalyst. In certain embodiments, the support is heat-treated at temperatures in a range from about 400° C. to about 1200° C., about 450° C. to about 1000° C., or about 600° C. to about 900° C. prior to combining with a metal. In some embodiments, impregnation aids may be used during preparation of the catalyst. Examples of impregnation aids include hydrogen peroxide, organic acids, amines, ethylenediaminetetraacetic acid (EDTA), ammonia, or mixtures thereof. Examples of amines include, but are not limited to, alkanolamines, ammonia, alkyl amines, aromatic amines, and substituted ammonium compounds. Organic acids include, but are not limited to, citric acid, tartaric acid, oxalic acid, malonic acid, malic acid, or mixtures thereof.

In certain embodiments, the support may be combined with a metal solution having a pH of up to about 3. The pH of the metal solution may range from about 1 to about 3, or from about 1.5 to about 2.5. Controlling the pH of the metal solution may facilitate dispersion of metals into the support. A dispersed or substantially dispersed metal catalyst prepared using such pH controlled conditions may have an increased catalyst life compared to the life of a conventional catalyst when used to process a crude feed at the same contacting conditions.

The metal solution may include Column 6 metal(s). In some embodiments, the metal solution includes Column 6 metal(s) in combination with Columns 7-10 metal(s). In certain embodiments, the metal solution includes Column 15 element(s) in combination with Column 6 metal(s), or in combination with Column 6 metal(s) and Columns 7-10 metal(s).

In some embodiments, the pH of the metal solution may be adjusted to the desired pH of up to pH 3 using mineral acids and/or organic acid components. Mineral acids include, but are not limited to, phosphoric acid, nitric acid, sulfuric acid, or mixtures thereof.

In certain embodiments, the metal solution is prepared by combining one or more Columns 6-10 metal solutions having different pH values. A Columns 6-10 metal solution having a pH in a range from about 4 to about 7, or from about 5 to about 6, may be combined with a different Columns 6-10 metal solution having a pH in a range from about 0.1 to about 4, or about 1 to about 3. In some embodiments, the Columns 6-10 metal solutions include impregnation aids, mineral acids, organic acids, Column 15 element(s), or mixtures thereof.

In certain embodiments, a catalyst may be formed by adding or incorporating multiple Columns 5-10 metal(s) to a support sequentially ("overlaying"). Overlaying a metal on top of a support that includes a substantially uniform concentration of metal often provides beneficial catalytic properties of the catalyst. Heat-treating the support after each overlay of metal tends to improve the catalytic activity of the catalyst. Methods to prepare a catalyst using overlay methods are described in U.S. Patent Application Publication No. US 2003/0111391 to Bhan.

In some embodiments, a support/Columns 7-10 metal(s) mixture is prepared by combining a support with one or more Columns 7-10 metal(s). In an embodiment, the resulting mixture includes about 0.01 grams to about 0.1 grams of Columns 7-10 metal(s) per gram of the support/Columns 7-10 metal(s) mixture. The support/Columns 7-10 metal(s) mixture may be heat-treated at a temperature in a range from about 50° C. to about 100° C. or about 60° C. to about 90° C. for several hours, and then heat-treated at a temperature in a range from about 400° C. to about 700° C., about 450° C. to about 650° C., or about 500° C. to about 600° C. for about 2 hours. The resulting metal-containing support may be combined with a Column 6 metal(s) and, optionally, an additional amount of Columns 7-10 metal(s) such that the finished catalyst contains, per gram of catalyst, at least 0.3 grams, at least 0.1 grams, or at least 0.08 grams of the Column 6 metal(s), and a total Columns 7-10 metal(s), per gram of catalyst, in a range from about 0.01 grams to about 0.2 grams or from about 0.05 grams to about 0.1 grams. The resulting catalyst may be heat-treated at a temperature in a range from about 50° C. to about 100° C. or from about 60° C. to about 90° C. for several hours, and then heat-treated at a temperature in a range from to about 350° C. to about 500° C. or 400° C. to about 450° C. for about 2 hours. In some embodiments, Column 15 element(s) may be combined with the support/Columns 7-10 metal(s) mixture and/or with the Column 6 metal(s).

Typically, the Columns 5-10 metal(s) and support may be mixed with suitable mixing equipment to form a Columns 5-10 metal(s)/support mixture. Examples of suitable mixing equipment include tumblers, stationary shells or troughs, Muller mixers (for example, batch type or continuous type), impact mixers, and any other generally known mixer or device, that will suitably provide the Columns 5-10 metal(s)/support mixture. In certain embodiments, the materials are mixed until the Columns 5-10 metal(s) is (are) substantially homogeneously dispersed in the support.

In some embodiments, the catalyst is heat-treated at temperatures from about 150° C. to about 750° C., from about 200° C. to about 740° C., or from about 400° C. to about 730° C. after combining the support with the metal.

In some embodiments, the catalyst may be heat-treated in the presence of hot air and/or oxygen rich air at a temperature in a range between about 400° C. and about 1000° C. to remove volatile matter such that at least a portion of the Columns 5-10 metal(s) are converted to the corresponding metal oxide(s).

In other embodiments, however, the catalyst may be heat-treated in the presence of air at temperatures in a range from about 35° C. to about 500° C. for a period of time in a range from 1 hour to about 3 hours to remove a majority of the volatile components without substantially converting the Columns 5-10 metal(s) to metal oxide(s). Catalysts prepared by such a method are generally referred to as "uncalcined" catalysts. When catalysts are prepared in this manner, in combination with a sulfiding method, the active metals may be substantially dispersed on the support. Preparations of such catalysts are described in U.S. Pat. Nos. 6,218,333 to Gabrielov et al. and 6,290,841 to Gabrielov et al.

In certain embodiments, a theta alumina support may be combined with Columns 5-10 metal(s) to form a theta alumina support/Columns 5-10 metal(s) mixture. The theta alumina support/Columns 5-10 metal(s) mixture may be heat-treated at a temperature of at least 400° C. to form a catalyst having a pore size distribution with a median pore diameter of at least 230 Å. Typically, such heat-treating is conducted at temperatures of at most 1200° C.

In some embodiments, bulk metals catalysts used to change properties of the crude feed include one or more Columns 6-10 metal(s). The bulk metal catalyst may have, per gram of catalyst, a total Columns 6-10 metal(s) content from at least 0.3 grams, at least 0.5 grams, at least 0.6 grams, at least 0.8 grams, or at least 0.9 grams. The total Columns 6-10 metal(s) content, per gram of catalyst, may be in a range from about 0.3 grams to about 0.99 grams, from about 0.5 grams to about 0.9 grams, or from about 0.6 grams to about 0.8 grams.

In some embodiments, the catalyst includes Column 15 element(s) in addition to the Columns 6-10 metal(s). The bulk metal catalyst may have a total Column 15 element content, per gram of catalyst, in range from about 0.000001 grams to 0.1 grams, about 0.00001 grams about 0.06 grams, about 0.00005 grams to about 0.03 grams, or about 0.0001 grams to about 0.001 grams.

The bulk metal catalyst, in some embodiments, may include a binder. The binder may be silica, alumina oxide, zinc oxide, oxides of the Columns 6-10 metal(s), carbon, zeolites, or mixtures thereof. In certain embodiments, the catalyst includes at most 0.2 grams, at most 0.1 grams, at most 0.05 grams, at most 0.01 grams, or at most 0.005 grams of binder per gram of catalyst.

The bulk metal catalyst may be prepared as described in U.S. Pat. Nos. 4,937,218 to Aqudelo et al.; 6,162,350 to Soled et al.; and 6,783,663 to Riley et al.; U.S. Patent Application Publication Nos. US 2004/0182749 to Domokos et al. and US 2004/0235653 to Domokos et al.; and by Landau et al. in "Hydrosulfurization of Methyl-Substituted Dibenzothiophenes: Fundamental Study of Routes to Deep Desulfurization, *Journal of Catalysis*, 1996, Vol. 159, pp. 236-235.

In some embodiments, one or more Columns 6-10 metal slurries in water or other protic liquids are contacted at a temperature in a range from about 25° C. to about 95° C. with a slurry of water, alkaline compound, and a binder to form a Columns 6-10 metal/binder slurry. The Columns 6-10 metal slurries may include 0.01 grams to 0.8 grams, 0.02 grams to 0.5 grams, or 0.05 grams to 0.3 grams of Columns 6-10 metal(s) per gram of slurry. In some embodiments, the alkali compound is ammonia. An amount of alkali compound may be at least 0.5 moles, at least 0.7 moles, at least 0.8 moles, at least, 0.9 moles or at most 2 mole per mole of Columns 6-10 metal(s), based on the oxide form of the Columns 6-10 metal(s). In some embodiments, the binder may be silica, alumina, silica/alumina, titanium oxide, zirconium oxide, or mixtures thereof.

The Columns 6-10 metal/binder slurry may be held at ambient and/or at the slurry to temperature for a period of time (for example, at least 10 minutes, at least 30 minutes, or at least 240 minutes) and then cooled, if necessary. The bulk metal catalyst may be isolated from the slurry using general isolation techniques (for example, filtration, spray dying, flash drying, evaporation, and vacuum distillation). The bulk metal catalyst may be heat-treated in a range from about 25° C. to 95° C., from about 55° C. to about 90° C., or from about 70° C. to about 80° C. In some embodiments, the bulk metal catalyst is further heat-treated at a temperature in a range from about 100° C. to about 600° C., from about 120° C. to about 400° C., or at most 300° C. In certain embodiments, the bulk metal catalyst may be powdered, shaped, and/or combined with other materials.

The bulk metal catalyst may be characterized using powder x-ray diffraction methods. In some embodiments, the bulk metal catalyst may exhibit no significant reflection that can be assigned to the Columns 6-10 metal components. No significant reflection as detected by x-ray diffraction methods may indicate that the bulk metal catalyst is substantially amorphous, or amorphous.

In some embodiments, the support (either a commercial support or a support prepared as described herein) may be combined with a supported catalyst and/or a bulk metal catalyst. In some embodiments, the supported catalyst may include Column 15 element(s). For example, the supported catalyst and/or the bulk metal catalyst may be converted into a powder with an average particle size from about 1 micron to about 50 microns, about 2 microns about 45 microns, or about 5 microns to about 40 microns. The powder may be combined with a support to form an embedded metal catalyst. In some embodiments, the powder may be combined with the support and then extruded using standard techniques to form a catalyst having a pore size distribution with a median pore diameter in a range from about 80 Å to about 200 Å or about 90 Å to about 180 Å, or about 120 Å to about 130 Å. Combining the catalyst with the support allows, in some embodiments, at least a portion of the metal to reside under the surface of the resulting embedded metal catalyst leading to less metal on the surface than would otherwise occur in the unembedded metal catalyst. In some embodiments, having less metal on the surface of the catalyst extends the life and/or catalytic activity of the catalyst by allowing at least a portion of the metal to move to the surface of the catalyst during use. The metals may move to the surface of the catalyst through erosion of the surface of the catalyst during contact of the catalyst with a crude feed.

In some embodiments, catalysts may be characterized by pore structure. Various pore structure parameters include, but are not limited to, pore diameter, pore volume, surface areas, or combinations thereof. The catalyst may have a distribution of total quantity of pore size versus pore diameter. The median pore diameter of the pore size distribution may be in a range from about 30 Å to about 1000 Å, about 50 Å to about 500 Å, or about 60 Å to about 300 Å. In some embodiments, catalysts that include at least 0.5 grams of gamma alumina per gram of catalyst have a pore size distribution with a median pore diameter in a range from about 50 Å to about 500 Å, about 60 Å to about 200 Å, about 90 Å to about 180 Å, about 100 Å to about 140 Å, or about 120 Å to about 130 Å. In other embodiments, catalysts that include at least 0.1 grams of theta alumina per gram of catalyst have a pore size distribution with a median pore diameter in a range from about 180 Å to about 500 Å, about 200 Å to about 300 Å, or about 230 Å to about 250 Å. Such median pore diameters are typically at most 1000 Å.

In certain embodiments, the median pore diameter of the pore size distribution is greater than 110 Å, at least 120 Å, at least 130 Å, at least 140 Å, at least 150 Å, at least 200 Å, or at least 250 Å. Such median pore diameters are typically at most 300 Å. The median pore diameter of the pore size distribution may be in a range from about 115 Å to about 290 Å, from about 120 Å to about 190 Å, from about 130 Å to about 180 Å, or from about 140 Å to about 160 Å.

In some embodiments, the catalyst having the pore size distribution has at least 60% of a total number of pores in the pore size distribution with a pore diameter within about 45 Å, about 35 Å, about 30 Å, about 25 Å, or about 20 Å of the median pore diameter of the pore distribution. In embodiments in which the median pore diameter of the pore size distribution is at least 180 Å, at least 200 Å, or at least 230 Å, greater that 60% of a total number of pores in the pore size distribution have a pore diameter within about 50 Å, about 70 Å, or about 90 Å of the median pore diameter. In some embodiments, the catalyst has a pore size distribution with a median pore diameter in a range from about 180 Å to about 500 Å, about 200 Å to about 400 Å, or about 230 Å to about 300 Å, with at least 60% of a total number of pores in the pore size distribution having a pore diameter within about 50 Å, about 70 Å, or about 90 Å of the median pore diameter.

In some embodiments, pore volume of pores may be at least 0.3 cm$^3$/g, at least 0.7 cm$^3$/g or at least 0.9 cm$^3$/g. In certain embodiments, pore volume of pores may range from about 0.3 cm$^3$/g to about 0.99 cm$^3$/g, about 0.4 cm$^3$/g to about 0.8 cm$^3$/g, or about 0.5 cm$^3$/g to about 0.7 cm$^3$/g. In some embodiments, pores having a pore diameter of at least 350 Å, at least 400 Å, at least 500 Å, at least 1000 Å, at least 3000 Å, or at least 5000 Å provide at most 10%, at most 5%, at most 3%, at most 1%, or at most 0.5% of the total pore volume of the catalyst. Such pore diameters may be in a range of about 350 Å to about 5000 Å, about 400 Å to about 1000 Å, or about 500 Å to about 900 Å. The total pore volume provided by pores with such pore diameters may be in a range from about 0% to about 9%, about 0.1% to about 5%, or about 0.5% to about 1%.

The catalyst having a pore size distribution with a median pore diameter in a range from about 60 Å to about 500 Å may, in some embodiments, have a surface area of at least 100 m$^2$/g, at least 120 m$^2$/g, at least 170 m$^2$/g, at least 220 m$^2$/g, or at least 270 m$^2$/g. Such surface area may be in a range from about 100 m$^2$/g to about 300 m$^2$/g, about 120 m$^2$/g to about 270 m$^2$/g, about 130 m$^2$/g to about 250 m$^2$/g, or about 170 m$^2$/g to about 220 m$^2$/g. In certain embodiments, a surface area of a shaped bulk metal catalyst is at least 30 m$^2$/g, at least 60 m$^2$/g, or in a range from about 10 m$^2$/g to about 350 m$^2$/g.

In some embodiments, the bulk metal catalyst, the supported catalyst and/or the catalyst precursor is sulfided to form metal sulfides (prior to use) using techniques known in the art (for example, ACTICAT™ process, CRI International, Inc.). In some embodiments, the catalyst(s) and/or catalyst precursor may be dried then sulfided. Alternatively, the catalyst(s) or catalyst precursor may be sulfided in situ by contact of the catalyst or catalyst precursor with a crude feed that includes sulfur-containing compounds. In-situ sulfurization may utilize either gaseous hydrogen sulfide in the presence of hydrogen, or liquid-phase sulfurizing agents such as organo-sulfur compounds (including alkylsulfides, polysulfides, thiols, and sulfoxides). Ex-situ sulfurization processes are described in U.S. Pat. Nos. 5,468,372 to Seamans et al. and 5,688,736 to Seamans et al.

In certain embodiments, a first type of catalyst ("first catalyst") includes Columns 5-10 metal(s) in combination with a theta alumina support. The first catalyst has a pore size distribution with a median pore diameter of at least 180 Å, at least 220 Å, at least 230 Å, at least 250 Å, at least 300 Å, or at most 500 Å. The support may include at least 0.1 grams, at least 0.5 grams, or at least 0.9 grams, or at most 0.999 grams of theta alumina per gram of support. In some embodiments, the support has an alpha alumina content of below 0.1 grams of alpha alumina per gram of catalyst. The catalyst includes, in some embodiments, at most 0.1 grams of Column 6 metal(s) per gram of catalyst and at least 0.0001 grams of Column 6 metal(s) per gram of catalyst. In some embodiments, the to Column 6 metal(s) are molybdenum and/or tungsten. In some embodiments, a first catalyst may include Column 5 metal(s). The first catalyst may allow for removal of alkali metals and alkaline-earth metals in metal salts of organic acids. The first catalyst is generally capable of removing at least a portion of the alkali metals and/or alkaline-earth metal salts of organic acids, which may reduce viscosity and/or surface tension of the crude feed. This may allow the resulting crude feed to be more readily contacted with catalysts positioned after the first catalyst.

In certain embodiments, a second type of catalyst ("second catalyst") includes Columns 6-10 metal(s) in combination with a support. The second catalyst has a median pore diameter of greater than 110 Å. The second catalyst has pores with a pore diameter of at least 350 Å, which provide at most 10% of the pore volume of the second catalyst. The second catalyst has per gram of second catalyst, in some embodiments, a total content of Column 6 metal(s) in a range from about 0.0001 grams to about 0.3 grams, a total content of Columns 7-10 metal(s) in a range from about 0.0001 grams to about 0.1 grams, and a total content of Column 15 element(s) in a range from about 0.00001 grams to about 0.1 grams. In certain embodiments, the second catalyst support has, per gram of support, at least 0.9 grams of gamma alumina. The second catalyst is generally capable of: removing at least a portion of the components from the crude feed that contribute to thermal degradation as measured by MCR; removing at least a portion of organic nitrogen containing compounds; and removing at least a portion of the $C_5$ asphaltenes from the crude feed. The second catalyst, in some embodiments, also removes at least a portion of the residue, removes at least a portion of the Ni/Fe/V, removes at least a portion of the components that contribute to high viscosities, and/or removes at least a portion of the components that contribute to low API gravity.

In some embodiments, a third type of catalyst ("third catalyst") may have a median pore diameter of about 250 Å. The third catalyst has pores with a pore diameter of at least 350 Å, which provide at most 10% of the pore volume of the third catalyst. The third catalyst is generally capable of: removing at least a portion of the components from the crude feed that contribute to thermal degradation as measured by MCR; removing a portion of compounds containing heteroatoms; and/or removing a portion of the $C_5$ asphaltenes from the crude feed. The third catalyst, in some embodiments, also removes components that contribute to high viscosities and/or low API gravity.

In some embodiments, the second catalyst(s) and third catalyst(s) have selected median pore diameters and pores having selected pore diameters providing at most 10%, at most 5%, at most 3% or at most 1% of the pore volume. These catalysts provide enhanced reduction of $C_5$ asphaltenes content in the crude feed and/or reduction of at least a portion of the components that contribute to thermal degradation of the crude feed as measured by MCR. Reduction of these compounds using catalysts with selected median pore diameter and selected pore volume may allow the number of catalysts to be minimized Typically, the crude feed is first treated with a conventional catalyst having relatively low catalytic activity to remove $C_5$ asphaltenes and/or components that contribute to thermal degradation. These types of conventional catalysts generally remove the $C_5$ asphaltenes and/or other components by allowing a relatively large portion of the $C_5$ asphaltenes and/or other components to enter the pores of the catalysts and fill the pores. As the pores are filled, the $C_5$ asphaltenes and/or other components may be physically removed from the crude feed. Once the pores are filled and/or plugged, the life of the conventional catalyst becomes diminished. Catalysts with selected median pore diameter and selected pore volumes remove $C_5$ asphaltenes and/or other components that contribute to thermal degradation by limiting the portion, if any, of $C_5$ asphaltenes and/or other components that enter the pores of the catalyst. As such, the life of the catalyst may not be diminished due to contact of the catalyst with $C_5$ asphaltenes and/or other components.

In some embodiments, the second catalyst(s) and/or the third catalyst(s) may remove at least a portion of the alkali metals and alkaline-metals in metal salts of organic acids. In certain embodiments, the second catalyst(s) and/or the third catalyst(s) are capable of removing at least a portion of the alkali metals and/or alkaline-earth metal salts of organic acids that contribute to formation of compounds that increase viscosity and/or surface tension of the crude feed. In some embodiments, the second catalyst(s) and/or the third catalyst(s) are capable of removing at least a portion of the components that contribute to relatively high viscosity of the crude feed.

In some embodiments, a fourth type of catalyst ("fourth catalyst") may be obtainable by combining a support with Column 6 metal(s) to produce a catalyst precursor. Typically, the catalyst precursor is heated to at least 100° C. for about 2 hours. In certain embodiments, the fourth catalyst(s) may have, per gram of fourth catalyst(s), a Column 15 element(s) content in a range from about 0.001 grams to about 0.03 grams, 0.005 grams to about 0.02 grams, or 0.008 grams to about 0.01 grams. The fourth catalyst(s) may exhibit significant activity and stability when used to treat the crude feed as described herein. In some embodiments, the catalyst precursor is heated at temperatures below 500° C. in the presence of one or more sulfur compounds. The fourth catalyst(s) is (are) generally capable of removing a portion of nitrogen containing compounds from the crude feed. Removal of nitrogen containing compounds decreases the corrosive properties of the crude product relative to the corrosive properties of the crude feed. The fourth catalyst(s) may remove at least a portion of the components that contribute to the TAN of the crude feed, remove at least a portion of the metals in metal salts of organic acids, remove at least a portion of the Ni/V/Fe, and/or remove at least a portion of components contributing to a high viscosity of the crude feed.

The fourth catalyst(s), in some embodiments, may also reduce at least a portion of the MCR content of the crude feed, while maintaining crude feed/total product stability. In certain embodiments, the fourth catalyst(s) may have a Column 6 metal(s) content in a range from about 0.0001 grams to about 0.1 grams, about 0.005 grams to about 0.05 grams, or about 0.001 grams to about 0.01 grams and a Column 10 metal(s) content in a range from about 0.0001 grams to about 0.05 grams, about 0.005 grams to about 0.03 grams, or about 0.001 grams to about 0.01 grams per gram of fourth catalyst(s). The fourth catalyst(s) may facilitate reduction of at least a portion of the components that contribute to MCR in the crude feed at temperatures in a range from about 300° C. to about 500° C. or about 350° C. to about 450° C. and pressures in a range from about 0.1 MPa to about 20 MPa, about 1 MPa to about 10 MPa, or about 2 MPa to about 8 MPa.

In certain embodiments, a fifth type of catalyst ("fifth catalyst") may be a bulk metal catalyst. The fifth catalyst(s) includes at least 0.3 grams of Columns 6-10 metal(s) per gram of fifth catalyst(s). In certain embodiments, the fifth catalyst(s) also includes the binder. The fifth catalyst(s), in some embodiments, includes Column 6 metal(s) in combination with Column 9 metal(s) and/or Column 10 metal(s). The fifth catalyst(s) is generally capable of removing at least a portion of the components that contribute to thermal degradation as measured by MCR. The fifth catalyst(s), in some embodiments, is also capable of removing at least a portion of $C_5$ asphaltenes, at least a portion of organic compounds containing heteroatoms, at least a portion of the total Ni/V/Fe content, at least a portion of the components that contribute to high viscosity, and/or at least a portion of the components that contribute to low API gravity.

The first catalyst(s), second catalyst(s), third catalyst(s), fourth catalyst(s), and fifth catalyst(s), may be stable for at least 3 months, at least 6 months or at least 1 year at to temperatures of at least 370° C., at least 380° C., at least 390° C., at least 400° C., or at least 420° C., and pressures of at least 8 $Nm^3/m^3$, at least 10 $Nm^3/m^3$, or at least 14 $Nm^3/m^3$ during contact with the crude feed.

In some embodiments, the crude feed may be contacted with an additional catalyst subsequent to contact with the first catalyst. The additional catalyst may be one or more of the following: the second catalyst, the third catalyst, the fourth catalyst, the fifth catalyst, the commercial catalysts described herein, or combinations thereof.

Other embodiments of the first catalyst(s), second catalyst(s), third catalyst(s), fourth catalyst(s), and fifth catalyst(s) may also be made and/or used as is otherwise described herein.

Selecting the catalyst(s) of this application and controlling operating conditions may allow a crude product to be produced that has a MCR content, a nitrogen content, a content of metals in metal salts of organic acids, and/or selected properties changed relative to the crude feed. The resulting crude product may have enhanced properties relative to the crude feed and, thus, be more acceptable for transporting and/or refining.

Arrangement of two or more catalysts in a selected sequence may control the sequence of property improvements for the crude feed. For example, metals in metal salts of organic acids in the crude feed can be reduced before at least a portion of the components contributing to MCR and/or heteroatoms in the crude feed are reduced.

Arrangement and/or selection of the catalysts may, in some embodiments, improve lives of the catalysts and/or the stability of the crude feed/total product mixture. Improvement of a catalyst life and/or stability of the crude feed/total product mixture during processing may allow a contacting system to operate for at least 3 months, at least 6 months, or at least 1 year without replacement of the catalyst in the contacting zone. A life of the catalyst may be determined by measuring the temperature change of the contacting zone over a period of time (for example, one month, two months, three months, six months, and/or one year), while other contacting conditions remain relatively constant such that certain product specifications are maintained. A requirement for an increase in the temperature of about 15° C., about 13° C., or about 10° C. above the initial temperature required for processing, may indicate that the effectiveness of the catalyst is diminished.

Combinations of selected catalysts may allow reduction in at least a portion of the MCR content, at least a portion of the Ni/V/Fe, at least a portion of the $C_5$ asphaltenes, at least a portion of the metals in metal salts of organic acids, at least a portion of the components that contribute to TAN, at least a portion of the residue, or combinations thereof, from the crude feed before other properties of the crude feed are changed, while maintaining the stability of the crude feed/total product mixture during processing (for example, maintaining a crude feed P-value of above 1.5). Alternatively, $C_5$ asphaltenes, TAN, and/or API gravity may be incrementally reduced by contact of the crude feed with selected catalysts. The ability to incrementally and/or selectively change properties of the crude feed may allow the stability of the crude feed/total product mixture to be maintained during processing.

The first catalyst allows, in some embodiments, for removal of at least a portion of metals in metal salts of organic acids from the crude feed. For example, reducing at least a portion of the metals in metal salts of organic acids in the crude feed/total product mixture relative to the crude feed inhibits plugging of other catalysts positioned downstream, and thus, increases the length of time the contacting system may be operated without replenishment of catalyst. Removal of at least a portion of the metals in metal salts of organic acids from the crude feed may, in some embodiments, increase a life of one or more catalysts positioned after the first catalyst.

The second catalyst(s), the third catalyst(s), and/or the fourth catalyst(s) may be positioned downstream of the first catalyst. Further contact of the crude feed/total product mixture with the second catalyst(s), third catalyst(s), and/or the fourth catalyst(s) may reduce MCR content, reduce the content of Ni/V/Fe, reduce sulfur content, reduce oxygen content, reduce viscosity, and/or further reduce the content of metals in metal salts of organic acids.

In some embodiments, the fifth catalyst(s) may be positioned downstream of commercial catalysts. The commercial catalysts may be used to remove at least a portion of the Ni/V/Fe in a crude feed. Further contact of the crude feed/total product mixture with the fifth catalyst(s) may reduce MCR content, reduce sulfur content, reduce nitrogen content, and/or reduce oxygen content.

In some embodiments, catalyst selection and/or order of catalysts in combination with controlled contacting conditions (for example, temperature and/or crude feed flow rate) may assist in reducing hydrogen uptake by the crude feed, maintaining crude feed/total product mixture stability during processing, and changing one or more properties of the crude product relative to the respective properties of the crude feed. Stability of the crude feed/total product mixture may be affected by various phases separating from the crude feed/total product mixture. Phase separation may be caused by, for example, insolubility of the crude feed and/or crude product in the crude feed/total product mixture, flocculation of asphaltenes from the crude feed/total product mixture, precipitation of components from the crude feed/total product mixture, or combinations thereof.

At certain times during the contacting period, the concentration of crude feed and/or total product in the crude feed/total product mixture may change. As the concentration of the total product in the crude feed/total product mixture changes due to formation of the crude product, solubility of the components of the crude feed and/or components of the total product in the crude feed/total product mixture tends to change. For example, the crude feed may contain components that are soluble in the crude feed at the beginning of processing. As properties of the crude feed change (for example, TAN, MCR, $C_5$ asphaltenes, P-value, or combinations thereof), the components may tend to become less soluble in the crude feed/total product mixture. In some instances, the crude feed and the total product may form two phases and/or become insoluble in one another. Solubility changes may also result in the crude feed/total product mixture forming two or more phases. Formation of two phases, through flocculation of asphaltenes, change in concentration of crude feed and total product, and/or precipitation of components, tends to reduce the life of one or more of the catalysts. Additionally, the efficiency of the process may be reduced. For example, repeated treatment of the crude feed/total product mixture may be necessary to produce a crude product with desired properties.

During processing, the P-value of the crude feed/total product mixture may be monitored and the stability of the process, crude feed, and/or crude feed/total product mixture may be assessed. Typically, a P-value that is at most 1.5 indicates that flocculation of asphaltenes from the crude feed generally occurs. If the P-value is initially at least 1.5, and such P-value increases or is relatively stable during contacting, then this indicates that the crude feed is relatively stabile during contacting. Crude feed/total product mixture stability, as assessed by P-value, may be controlled by controlling contacting conditions, by selection of catalysts, by selective ordering of catalysts, or combinations thereof. Such controlling of contacting conditions may include controlling LHSV, temperature, pressure, hydrogen uptake, crude feed flow, or combinations thereof.

Catalysts described herein may facilitate reduction of MCR content and viscosity at elevated temperatures and pressures while maintaining the stability of the crude feed/total product mixture and/or maintaining the lives of the catalysts.

In some embodiments, contacting conditions are controlled such that temperatures in one or more contacting zones may be different. Operating at different temperatures allows for selective change in crude feed properties while maintaining the stability of the crude feed/total product mixture. The crude feed enters a first contacting zone at the start of a process. A first contacting temperature is the temperature in the first contacting zone. Other contacting temperatures (for example, second temperature, third temperature, fourth temperature, et cetera) are the temperatures in contacting zones that are positioned after the first contacting zone. A first contacting temperature may be in a range from about 100° C. to about 420° C. and a second contacting temperature may be in a range that is about 20° C. to about 100° C., about 30° C. to about 90° C., or about 40° C. to about 60° C. different than the first contacting temperature. In some embodiments, the second contacting temperature is greater than the first contacting temperature. Having different contacting temperatures may reduce TAN and/or $C_5$ asphaltenes content in a crude product relative to the TAN and/or the $C_5$ asphaltenes content of the crude feed to a greater extent than the amount of TAN and/or $C_5$ asphaltene reduction, if any, when the first and second contacting temperatures are the same as or within 10° C. of each other.

EXAMPLES

Non-limiting examples of support preparations, catalyst preparations, and systems with selected arrangement of catalysts and controlled contacting conditions are set forth below.

Example 1

Preparation of a Catalyst Support. An alumina/silica support was prepared by mulling 550 grams of an alumina/silica mixture, 26 grams of calcined alumina fines, 585 grams of water, and 8 grams of 16M nitric acid for 35 minutes. The alumina/silica mixture was prepared by combining at least 0.98 grams of alumina/silica mixture (Criterion Catalysts and Technologies LP) per gram of support with up to 0.02 grams of silica (Criterion Catalysts and Technologies LP) per gram of alumina/silica mixture. The mulled mixture was extruded through 1.94 mm and 3.28 mm diameter die plates, and then heat-treated at a temperature in a range from 93° C. (200° F.) to 121° C. (250° F.) until a loss on ignition in a range of 27 wt % to 30 wt %, based on initial extrudate weight, was obtained. Loss on ignition was performed by heating the extrudates to 540° C. for 15 minutes to 50 minutes, and then determining the relative amount of weight lost by the extrudates. The extrudates were further heat-treated at 918° C. (1685° F.) for 1 hour. The support had an average pore diameter of 125 Å, a surface area of 281 m²/g, a pore volume of 0.875 cm³/g, and pores with a diameter of at least 350 Å, which provided 0.9% of the total pore volume of the support. Example 1 demonstrates preparation of a support that has an average pore diameter of at least 90 Å and pores having a pore diameter of at least 350 Å provide at most 15% of the pore volume of the support.

Example 2

Preparation of a Catalyst having a Median Pore Diameter of 115 Å and a Selected Pore Volume Distribution. A catalyst was prepared as follows. An alumina/silica support prepared as described in Example 1 was impregnated with a molybdenum/nickel/phosphorus impregnation solution prepared as follows. A first solution was made by combining 62.34 grams of $(NH_4)_2Mo_2O_7$, 17.49 grams of $MoO_3$, 12.22 grams of 30% $H_2O_2$, and 50.47 grams of deionized water to form a slurry. MEA (3.0 grams) was added to the slurry at a rate sufficient to control the exotherm of dissolution. The slurry was heated to 64° C. (147° F.) until the solids dissolved, and then cooled to room temperature. The pH of the first solution was 5.34.

A second solution was made by combining 8.2 grams of $Ni(NO_3)_2.6H_2O$ and 5.47 grams of $NiCO_3$ with 30.46 grams of deionized water, and then adding 29.69 grams of 85 wt % $H_3PO_4$. The pH of the second solution was 0.29. The first solution and second solution were combined, and sufficient deionized water was added to bring the combined solution volume up to 218.75 mL to yield the molybdenum/nickel/phosphorus impregnation solution. The pH of the impregnation solution was 2.02.

The support (200.0 grams) was combined with the impregnation solution and aged for several hours with occasional agitation. The resulting support/metal mixture was heat-treated at 125° C. for several hours, and then heat-treated at 482° C. (900° F.) for 2 hours. The resulting catalyst contained, per gram of catalyst, 0.13 grams of molybdenum, 0.03 grams of nickel, and 0.03 grams of phosphorus with the balance being support. The catalyst had a pore size distribution with a median pore diameter of 115 Å with 66.7% of the total number of pores having a pore diameter within 28 Å of the median pore diameter. The surface area of the catalyst was 179 m²/g. The pore volume of the catalyst was 0.5 cm³/g. The pore volume distribution is summarized in Table 1.

TABLE 1

| Range, Å | % of pore volume Catalyst |
|---|---|
| <70 | 3.07 |
| 70-100 | 16.21 |
| 100-130 | 69.36 |
| 130-150 | 7.81 |
| 150-180 | 0.86 |
| 180-200 | 0.37 |
| 200-240 | 0.47 |
| 240-300 | 0.39 |
| 300-350 | 0.23 |
| 350-450 | 0.27 |
| 450-600 | 0.23 |
| 600-1000 | 0.27 |
| 1000-3000 | 0.22 |
| 3000-5000 | 0.72 |
| >5000 | 0 |

As shown in Table 1, the pores of the catalyst having a pore diameter of at least of 350 Å provided 1.71% of the total pore volume of the catalyst.

Example 2 demonstrates preparation of the Column 6 metal catalyst having a pore size distribution with a median pore diameter of greater than 110 Å, and a pore volume in which pores having a pore diameter of at least 350 Å provide at most 10% of the total pore volume. This example also demonstrates preparation of the Column 6 metal catalyst from a support having an average pore diameter of at least 90 Å, and a pore volume in which pores having a pore diameter of at least 350 Å provide at most 15% of the total pore volume.

Example 3

Contact of a Crude Feed With Two Catalysts. A tubular reactor with a centrally positioned thermowell was equipped with thermocouples to measure temperatures throughout a catalyst bed. The catalyst bed was formed by filling the space between the thermowell and an inner wall of the reactor with catalysts and silicon carbide (20-grid, Stanford Materials; Aliso Viejo, Calif.). Such silicon carbide is believed to have low, if any, catalytic properties under the process conditions described herein. All catalysts were mixed with silicon carbide in a volume ratio of 2 parts silicon carbide to 1 part catalyst before placing the mixture into the contacting zone portions of the reactor.

The crude feed flow to the reactor was from the top of the reactor to the bottom of the reactor. Silicon carbide was positioned at the bottom of the reactor to serve as a bottom support. A bottom catalyst/silicon carbide mixture (81 cm$^3$) was positioned on top of the silicon carbide to form a bottom contacting zone. The bottom catalyst was prepared as described in Example 2.

A top catalyst/silicon carbide mixture (9 cm$^3$) was positioned on top of the bottom contacting zone to form a top contacting zone. The top catalyst was a supported molybdenum/vanadium catalyst prepared by combining a support containing theta alumina with molybdenum and vanadium. The support was prepared by mulling 576 grams of alumina (Criterion Catalysts and Technologies LP. Michigan City, Mich., U.S.A.) with 585 grams of water and 8 grams of glacial nitric acid for 35 minutes. The resulting mulled mixture was extruded through a 1.3 mm die plate, heat-treated between 90° C. and about 125° C., and further heat-treated at 918° C. The heat-treated support was placed in a Lindberg furnace. The furnace temperature was raised to about 1000° C. to about 1100° C. over 1.5 hours, and then held in this range for 2 hours to produce the support. The support included, per gram of support, 0.0003 grams of gamma alumina, 0.0008 grams of alpha alumina, 0.0208 grams of delta alumina, and 0.9781 grams of theta alumina, as determined by x-ray diffraction. The support was impregnated with a molybdenum/vanadium impregnation solution prepared as follows. A first solution was made by combining 2.14 grams of $(NH_4)_2Mo_2O_7$, 3.21 grams of $MoO_3$, 0.56 grams of 30% $H_2O_2$, 0.14 grams of MEA, and 3.28 grams of deionized water to form a slurry. The slurry was heated to 65° C. until solids dissolved, and then cooled to room temperature. A second solution was made by combining 3.57 grams of $VOSO_4.xH_2O$ (x=3 to 5) with 40 grams of deionized water. The first solution and second solution were combined and sufficient deionized water was added to bring the combined solution volume up to 82 mL to yield the molybdenum/vanadium impregnation solution. The alumina was impregnated with the molybdenum/vanadium impregnation solution, and aged for 2 hours with occasional agitation. The resulting support/metal mixture was heat-treated at 125° C. for several hours, and then heat-treated at 480° C. for 2 hours. The resulting catalyst contained, per gram of catalyst, 0.02 grams of vanadium and 0.02 grams of molybdenum, with the balance being support. The molybdenum/vanadium catalyst had a pore size distribution with a median pore diameter of 300 Å.

Silicon carbide was positioned on top of the top contacting zone to fill dead space and to serve as a preheat zone. The catalyst bed was loaded into a Lindberg furnace that included four heating zones corresponding to the preheat zone, the top and bottom contacting zones, and the bottom support.

The catalysts were sulfided by introducing a gaseous mixture of 5 vol % hydrogen sulfide and 95 vol % hydrogen gas into the contacting zones at a rate of about 1.5 liter of gaseous mixture per volume (mL) of total catalyst (silicon carbide was not counted as part of the volume of catalyst) for the time periods set forth below. The reactor pressure was about 1.9 MPa (279.7 psi). Temperatures of the contacting zones were increased from ambient to 204° C. (400° F.) over 1 hour, and then held at 204° C. for 2 hours. After holding at 204° C., the contacting zones were increased incrementally to 316° C. (600° F.) at a rate of about 10° C. (about 50° F.) per hour. The contacting zones were maintained at 316° C. for an hour, incrementally raised to 370° C. (700° F.) over 1 hour, and then held at 370° C. for two hours. The contacting zones were then allowed to cool to ambient temperature.

After sulfiding, the contacting zones were then heated to 204° C. over 2 hours and the crude feed (BC-10, Brazil) having the properties summarized in Table 2 was fed to the top of the reactor. The crude feed flowed through the preheat zone, top contacting zone, bottom contacting zone, and bottom support of the reactor. The crude feed was contacted with each of the catalysts in the presence of hydrogen gas. Contacting conditions were as follows: ratio of hydrogen gas to the crude feed provided to the reactor was 656 Nm$^3$/m$^3$ (4000 SCFB), LHSV was 0.5 h$^{-1}$, and pressure was 13.8 MPa (2014.7 psi). The two contacting zones were incrementally heated from 204° C. to 390° C. at a rate in a range from 0.1° C. per hour to 10° C. per hour, and then maintained at 390° C. for 311 hours. Temperatures of the catalyst bed was incrementally raised to 400° C., and maintained at 400° C. for 352 hours.

The total product (that is, the crude product and gas) exited the catalyst bed. The total product was introduced into a gas-liquid phase separator. In the gas-liquid separator, the total product was separated into the crude product and gas. Gas input to the system was measured by a mass flow controller. Gas exiting the system was cooled to a temperature sufficient to remove any liquid components having a carbon number of at least 5 from the gas. The separated gas was measured using a wet test meter. The crude product was periodically analyzed to determine a weight percentage of components of the crude product. Crude product properties are summarized in Table 2.

TABLE 2

| Property | Crude Feed | Crude Product |
|---|---|---|
| TAN | 3.6 | ≦0.05 |
| API Gravity | 15.1 | 20 |
| Density at 15.56° C. (60° F.), g/cm$^3$ | 0.9651 | 0.9306 |
| Hydrogen, wt % | 11.4 | 12.1 |
| Carbon, wt % | 87.1 | 87.4 |
| Sulfur, wt % | 0.433 | 0.05 |
| Oxygen, wt % | 0.42 | 0.01 |
| Nitrogen, wt % | 0.52 | 0.24 |
| Basic Nitrogen, wt % | 0.16 | 0.08 |
| Calcium, wtppm | 3.5 | 0.6 |
| Potassium, wtppm | 1.8 | 1.3 |
| Sodium, wtppm | 5.3 | 0.6 |
| Nickel, wtppm | 12.4 | 7.3 |
| Vanadium, wtppm | 19.2 | 6.4 |
| Iron, wtppm | 10 | 0.4 |
| Micro-Carbon Residue, wt % | 8.5 | 4.6 |
| $C_5$ Asphaltenes, wt % | 7.5 | 4.3 |
| Naphtha, wt % | 0 | 4.1 |
| Distillate, wt % | 17.5 | 26.6 |
| VGO, wt % | 39.2 | 40.9 |
| Residue, wt % | 43.3 | 28.4 |
| P-Value | 5 | 3.6 |
| Viscosity at 37.8° C. (100° F.), cSt | 1705 | 156 |

As shown in Table 2, the crude product had, per gram of crude product, a nitrogen content of 0.0024 grams, a MCR content of 0.046 grams, and a $C_5$ asphaltenes content of 0.043 grams. The crude product also had a calcium content of 0.6 wtppm, a potassium content of 1.3 wtppm, and a sodium content of 0.6 wtppm.

Example 3 demonstrates that contacting the crude feed with one or more catalysts at controlled contacting conditions produced a total product that included the crude product. At least one of the catalysts was a Column 6 metal catalyst that: (a) included Column 6 metal(s); (b) had a pore size distribution with a median pore diameter of greater than 110 Å; and (c) had a pore volume in which pores having a pore diameter of at least 350 Å provided at most 10% of the pore volume. As measured by P-value, crude feed/total product mixture stability was maintained. The crude product had reduced MCR, a reduced alkali metal and alkaline-earth metal salts in organic acids, reduced Ni/V/Fe content, reduced sulfur content, reduced nitrogen content, reduced $C_5$ asphaltenes, and reduced oxygen content relative to the crude feed.

Example 4

Preparation of a Catalyst Support. An alumina support was prepared by mulling 550 grams of alumina powder (Criterion Catalysts and Technologies LP), 26 grams of calcined alumina fines, 585 grams of water, and 8 grams of 16M nitric acid for 35 minutes. The mulled mixture was extruded through 1.94 mm and 3.28 mm diameter die plates, heat-treated at 93° C. (200° F.), 107° C. (225° F.), and then heat-treated at 121° C. (250° F.) until a loss on ignition in a range of 27 wt % to 30 wt %, based on initial extrudate weight, was obtained. Loss on ignition was performed as described in Example 1. The extrudates were further heat-treated at 918° C. (1685° F.) for 1 hour. The support had an average pore diameter of 186.4 Å, a pore volume of 0.868 cm³/mL, and pores with a diameter of at least 350 Å, which provided 13.3% of the total pore volume of the support. Example 4 demonstrates preparation of a support that has an average pore diameter of at least 90 Å and a pore volume in which pores having a pore diameter of at least 350 Å provide at most 15% of the pore volume of the support.

Example 5

Preparation of a Catalyst having a Median Pore Diameter of 250 Å and a Selected Pore Volume Distribution. The alumina support prepared as described in Example 4 was impregnated with a molybdenum/cobalt/phosphorus impregnation solution prepared as follows. $MoO_3$ (22.95 grams) was combined with 85 wt % $H_3PO_4$ (12.67 grams), and heated to 82° C. (180° F.) to form a molybdenum/phosphorous solution. $Co(OH)_2$ (29.83 grams) was added to the molybdenum/phosphorus solution and the resulting molybdenum/cobalt/phosphorus solution was heated to 100° C. Citric acid monohydrate (21.5 grams) was added to the molybdenum/cobalt/phosphorus solution, heated to 100° C., and maintained at 100° C. for 1 hour. The resulting solution was reduced in volume to 252 mL to produce the molybdenum/cobalt/phosphorus impregnation solution. The impregnation solution had a pH of 3.22.

The alumina support (300.0 grams) was combined with the impregnation solution, aged for several hours with occasional agitation. The resulting support/metal mixture was heat-treated at 120° C. for several hours, and then heat-treated at 426° C. (800° F.) for 2 hours. The resulting catalyst was further heat-treated at 593° C. (1100° F.) for 2 hours. The catalyst contained, per gram of catalyst, 0.153 grams of molybdenum, 0.043 grams of cobalt, and 0.008 grams of phosphorus, with the balance being support. The catalyst had a pore size distribution with a median pore diameter of 250 Å, with 67% of the total number to of pores having a pore diameter within 58 Å of the median pore diameter. The surface area of the catalyst was 98 m²/g. The pore volume distribution is summarized in Table 3.

TABLE 3

| Range, Å | % of pore volume Catalyst |
|---|---|
| <70 | 0 |
| 70-100 | 0 |
| 100-130 | 0.15 |
| 130-150 | 0.5 |
| 150-180 | 2.5 |
| 180-200 | 4.25 |
| 200-240 | 22.66 |
| 240-300 | 63.77 |
| 300-350 | 3.36 |
| 350-450 | 0.98 |
| 450-600 | 0.46 |
| 600-1000 | 0.44 |
| 1000-3000 | 0.46 |
| 3000-5000 | 0.46 |
| >5000 | 0 |

As shown in Table 3, pores having a pore diameter of at least 350 Å provided 2.8% of the total pore volume of the catalyst.

Example 5 demonstrates the preparation of the Column 6 metal catalyst having a pore size distribution with a median pore diameter of greater than 110 Å, and a pore volume in which pores of at least 350 Å provide at most 10% of the total pore volume. This example also demonstrates the preparation of the Column 6 metal catalyst from a support having an average pore diameter of at least 90 Å, and a pore volume in which pores having a pore diameter of at least 350 Å provide at least 15% of the total pore volume.

Example 6

Contact of a Crude feed with Two Catalysts. The reactor apparatus (except for content of contacting zones), the crude feed, catalyst sulfiding method, total product to separation method, contacting conditions, contacting time, and crude product analysis were the same as described in Example 3.

The crude feed flowed from the top of the reactor to the bottom of the reactor. A molybdenum/cobalt/phosphorus catalyst/silicon carbide mixture (81 cm³) was positioned as a bottom catalyst in the bottom contacting zone. The bottom catalyst was prepared as described in Example 5.

A supported molybdenum/vanadium catalyst, prepared as described in Example 3, was mixed with silicon carbide. The supported molybdenum/vanadium catalyst/silicon carbide mixture (9 cm³) was positioned in the top contacting zone.

Crude product properties are summarized in Table 4.

TABLE 4

| Property | Crude Feed | Crude Product |
|---|---|---|
| TAN | 3.6 | ≦0.05 |
| API Gravity | 15.1 | 19.2 |
| Density at 15.56° C. (60° F.), g/cm³ | 0.9651 | 0.9554 |
| Hydrogen, wt % | 11.4 | 11.6 |
| Carbon, wt % | 87.1 | 87.6 |
| Sulfur, wt % | 0.43 | 0.16 |
| Oxygen, wt % | 0.42 | 0.11 |
| Nitrogen, wt % | 0.52 | 0.47 |

TABLE 4-continued

| Property | Crude Feed | Crude Product |
|---|---|---|
| Calcium, wtppm | 5.4 | 0.5 |
| Potassium, wtppm | 46 | 1.5 |
| Sodium, wtppm | 117 | 0.6 |
| Nickel, wtppm | 12.4 | 7.5 |
| Vanadium, wtppm | 19.2 | 6.2 |
| Iron, wtppm | 10.4 | 0.9 |
| Micro-Carbon Residue, wt % | 8.5 | 7.2 |
| $C_5$ Asphaltenes, wt % | 7.5 | 5.0 |
| Naphtha, wt % | 0 | 2.3 |
| Distillate, wt % | 17.5 | 20.3 |
| VGO, wt % | 39.2 | 42.0 |
| Residue, wt % | 43.3 | 35.4 |
| P-Value | 5 | 4.2 |
| Viscosity at 37.8° C. (100° F.), cSt | 1705 | 698 |

As shown in Table 4, the crude product had a nitrogen content of 0.0047 grams, a MCR content of 0.072 grams and a $C_5$ asphaltenes content of 0.05 grams, per gram of crude product. The crude product also had 0.5 wtppm of calcium, 1.5 wtppm of potassium, and 0.6 wtppm of sodium.

Example 6 demonstrates that contacting the crude feed with one or more catalysts with controlled contacting conditions, produced a total product that included the crude product. At least one of the catalysts was a Columns 6 metal catalyst that: (a) included Column 6 metal(s); (b) had a pore size distribution with a median pore diameter of greater than 110 Å; and (c) had a pore volume in which pores having a pore diameter of at least 350 Å provided at most 10% of the pore volume. The crude product had reduced MCR, reduced alkali metal and alkaline-earth metal salts of organic acids, reduced Ni/V/Fe content, reduced sulfur content, reduced nitrogen content, reduced $C_5$ asphaltenes, and reduced oxygen content relative to the crude feed.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A method of producing a crude product, comprising:
contacting a crude feed with one or more catalysts to produce a total product that includes the crude product, wherein the crude product is a liquid mixture at 25° C. and 0.101 MPa; the crude feed has a micro-carbon residue (MCR) content of at least 0.0001 grams per gram of crude feed; and at least one of the catalysts is a Column 6 metal catalyst that comprises: one or more metals from Column 6 of the Periodic Table and/or one or more compounds of one or more metals from Column 6 of the Periodic Table and a support; a pore size distribution with a median pore diameter of greater than 160 Å; and a pore volume in which pores having a pore diameter of at least 350 Å provide at most 10% of the pore volume, wherein pore volume and pore diameter are as determined by ASTM Method D4284; and
controlling contacting condition temperature, pressure, hydrogen source flow, crude feed flow or combinations thereof such that the crude product has a MCR content of at most 90% of the MCR content of the crude feed, wherein MCR content is as determined by ASTM Method D4530.

2. The method as claimed in claim 1, wherein MCR content of the crude product is at most 50% of the MCR content of the crude feed.

3. The method as claimed in claim 1, wherein the crude feed has from 0.0001 grams to 0.5 grams MCR per gram of crude feed.

4. The method as claimed in claim 1, wherein the Column 6 metal catalyst comprises in addition one or more metals from Columns 7-10 of the Periodic Table and/or one or more compounds of one or more metals from Columns 7-10 of the Periodic Table.

5. The method as claimed in claim 1, wherein the Column 6 metal catalyst comprises in addition one or more metals from Column 10 of the Periodic Table and/or one or more compounds of one or more metals from Column 10 of the Periodic Table.

6. The method as claimed in claim 1, wherein the Column 6 metal catalyst comprises in addition one or more elements from Column 15 of the Periodic Table and/or one or more compounds of one or more elements from Column 15 of the Periodic Table.

7. The method as claimed in claim 1, wherein the support has, per gram of support, at least 0.8 grams of gamma alumina.

8. The method as claimed in claim 1, wherein the contacting is performed in the presence of a hydrogen source, and contacting condition hydrogen source flow is controlled to produce the crude product.

9. The method as claimed in claim 1, wherein a crude feed/total product mixture has a P-value of at least 1.5 during contacting.

10. The method as claimed in claim 1, wherein the method further comprises combining the crude product with a crude that is the same as or different from the crude feed to form a blend.

11. The method of claim 1 further comprising the step of processing the crude product or blend to produce transportation fuel, heating fuel, lubricants, or chemicals.

* * * * *